United States Patent
Beak et al.

(10) Patent No.: US 9,586,715 B2
(45) Date of Patent: Mar. 7, 2017

(54) FLUID CONTAINMENT APPARATUS

(75) Inventors: Todd Beak, Anderson, SC (US); Kurt Johnson, Anderson, SC (US); David Doolin, Sandy Springs, SC (US); Russell J. Guffee, Pendleton, SC (US); Edward W. Van Romer, Anderson, SC (US)

(73) Assignee: BASIC CONCEPTS, INC, Anderson, SC (US)

( * ) Notice: Subject to any disclaimer, the term of this patent is extended or adjusted under 35 U.S.C. 154(b) by 325 days.

(21) Appl. No.: 13/605,355

(22) Filed: Sep. 6, 2012

(65) Prior Publication Data

US 2013/0240538 A1   Sep. 19, 2013

Related U.S. Application Data

(63) Continuation-in-part of application No. 13/017,685, filed on Jan. 31, 2011, now Pat. No. 8,562,251.

(51) Int. Cl.
| | | |
|---|---|---|
| *B65D 25/00* | (2006.01) | |
| *B65D 1/42* | (2006.01) | |
| *B65D 90/24* | (2006.01) | |
| *F16N 31/00* | (2006.01) | |
| *B08B 17/02* | (2006.01) | |

(52) U.S. Cl.
CPC ............ *B65D 1/42* (2013.01); *B08B 17/025* (2013.01); *B65D 90/24* (2013.01); *F16N 31/002* (2013.01)

(58) Field of Classification Search
CPC ..... A47L 15/503; E04H 4/0056; B65D 90/24; B65D 11/1833; B65D 90/205; B65D 7/20; B65D 7/24; B65D 11/186; B65D 1/42; B65D 2519/00094

USPC ... 220/668, 682, 9.1, 9.2, 9.3, 9.4, 693, 475, 220/646, 647, 651, 615, 616, 4.32, 4.08, 220/4.16, 6; 16/260; 141/86; 184/106; 405/52; 137/312

See application file for complete search history.

(56) References Cited

U.S. PATENT DOCUMENTS

| | | | |
|---|---|---|---|
| 5,090,588 A | | 2/1992 | Van Romer |
| 5,316,175 A | | 5/1994 | Van Romer |
| 5,351,837 A | * | 10/1994 | Smith .......................... 211/41.8 |
| 5,762,233 A | | 6/1998 | Van Romer |
| 5,800,091 A | | 9/1998 | Van Romer |
| 5,924,461 A | * | 7/1999 | Shaw et al. ..................... 141/86 |
| 5,928,751 A | | 7/1999 | Van Romer |
| 5,948,250 A | | 9/1999 | Middleton |
| 6,688,516 B1 | | 2/2004 | Ussen |
| 6,880,720 B2 | | 4/2005 | Van Romer |

(Continued)

*Primary Examiner* — Shawn M Braden
(74) *Attorney, Agent, or Firm* — J. Bennett Mullinax LLC

(57) ABSTRACT

A fluid containment apparatus with a floor and a side wall is provided. A wall support is included that supports the side wall and can be moved between an initial supporting position and a collapsed position. The side wall is movable from an initial containment position to a collapsed state to allow access for vehicles or other objects to the floor. The wall support and side wall are subsequently movable back to their initial positions. In some arrangements, the wall support is movable back to the initial supporting position from the collapsed position but is not movable beyond the initial supporting position. Additionally or alternatively, in other embodiments the wall support remains in the collapsed position until a returning force is applied to move the wall support back.

19 Claims, 20 Drawing Sheets

(56) References Cited

U.S. PATENT DOCUMENTS

| | | | |
|---|---|---|---|
| 7,036,676 B2 * | 5/2006 | Christensen | E04H 4/0056 |
| | | | 220/565 |
| 7,188,747 B2 | 3/2007 | Bennett et al. | |
| RE39,971 E | 1/2008 | Van Romer | |
| 7,374,062 B2 | 5/2008 | Van Romer | |
| 7,624,887 B2 * | 12/2009 | Avery | B65D 7/24 |
| | | | 220/668 |
| 2004/0118844 A1 * | 6/2004 | Bennett et al. | 220/4.12 |
| 2005/0205153 A1 | 9/2005 | MacDonald | |
| 2007/0278224 A1 | 12/2007 | Van Romer | |
| 2009/0175684 A1 | 7/2009 | Barrett et al. | |

\* cited by examiner

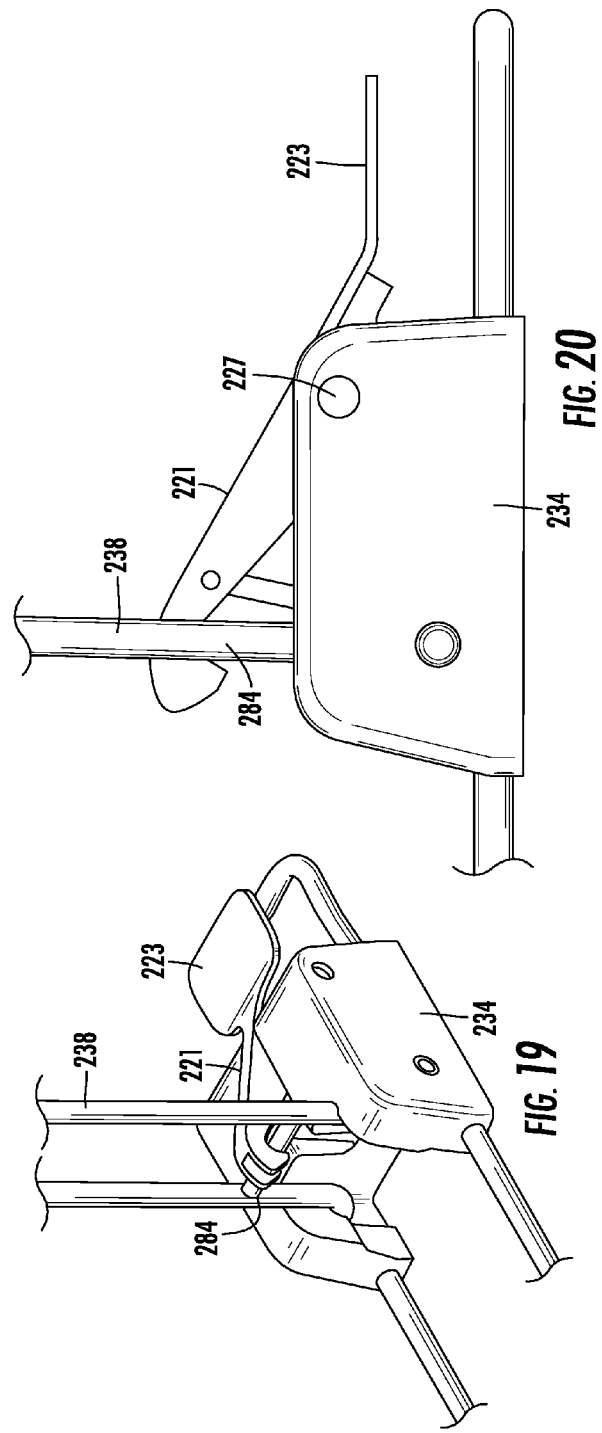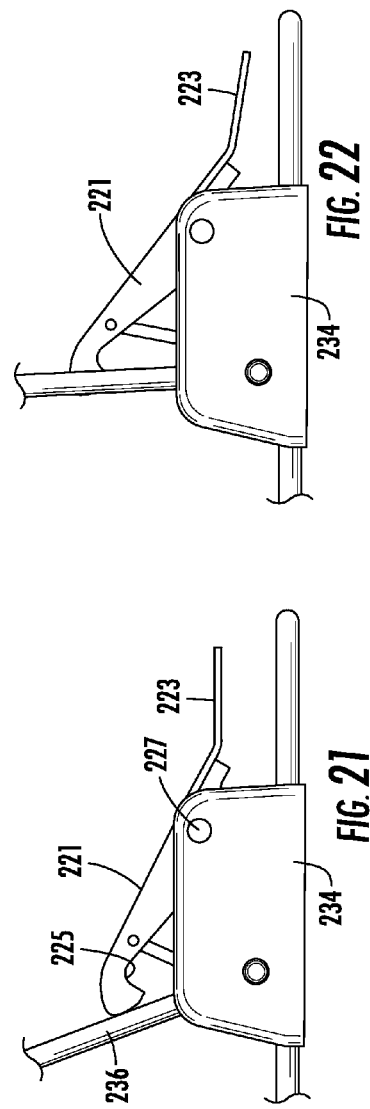

FLUID CONTAINMENT APPARATUS

RELATED APPLICATIONS

This application is a continuation in part of U.S. application Ser. No. 13/017,685 filed Jan. 31, 2011 now U.S. Pat. No. 8,562,251 and which is incorporated herein by reference.

FIELD OF THE INVENTION

The present invention relates generally to a fluid containment apparatus that can be used to capture fluid that is spilled or otherwise released during a maintenance procedure or other activity. More particularly, the present application involves a fluid containment apparatus that includes a wall support that can be lowered to allow a side wall to be lowered to facilitate entry or exit of a vehicle or other object onto the floor of the apparatus.

BACKGROUND

Portable, foldable containment devices are known for use in acting as a primary or secondary containment barrier to capture spills or run-offs of hazardous chemicals such as petrochemicals. The containment device generally includes a floor surrounded by a side wall that is supported by a number of wall supports. The containment device may be constructed in order to allow a vehicle, such as a tanker truck, to be driven into the containment device so that a maintenance or transfer procedure can be completed. The side wall must be capable of being disassembled, folding, or otherwise opened to allow the vehicle to enter the containment device and to subsequently exit the containment device.

The wall supports may be straps that can be situated against either the outside exterior surface of the side wall or against the interior surface of the side wall. The straps can give or flex when a vehicle is pushed against the side wall in order to allow the side wall to collapse so that the vehicle can then enter the containment device.

Another type of wall support includes a flexible hinge that is located outside of the containment area. The wall support can be anchored to a skirt that completely surrounds the side wall. An upper support member can be attached to the hinge and to the side wall in order to support the side wall. The hinge may be biased to an initial at rest position in which the side wall is supported by the upper support member. When a vehicle pushes against the side wall, the hinge will flex so that the upper support member is pressed flat. Once the vehicle drives over the side wall and is located within the containment area, the biased hinge will spring back into its initial position and thus the upper support member and the side wall will likewise move back into its at rest position. Once the maintenance, transfer, or other procedure is finished, the vehicle can be driven back against the interior surface of the side wall. The biased hinge is capable of flexing 180° so that it can flex outwards towards the skirt so that the upper support member and the side wall can flex away from the containment area to allow the vehicle to exit the containment area. Although capable of supporting a side wall and allowing the side wall to collapse, current arrangements are not robust in that they require a hinge that is biased and is capable of flexing a great amount. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIGS. 19-22 are perspective views of an alternative embodiment of a wall support having an actuated release lever.

FIGS. 19-22 are perspective views of an alternative embodiment of a wall support having an actuated release lever.

Figure 1:
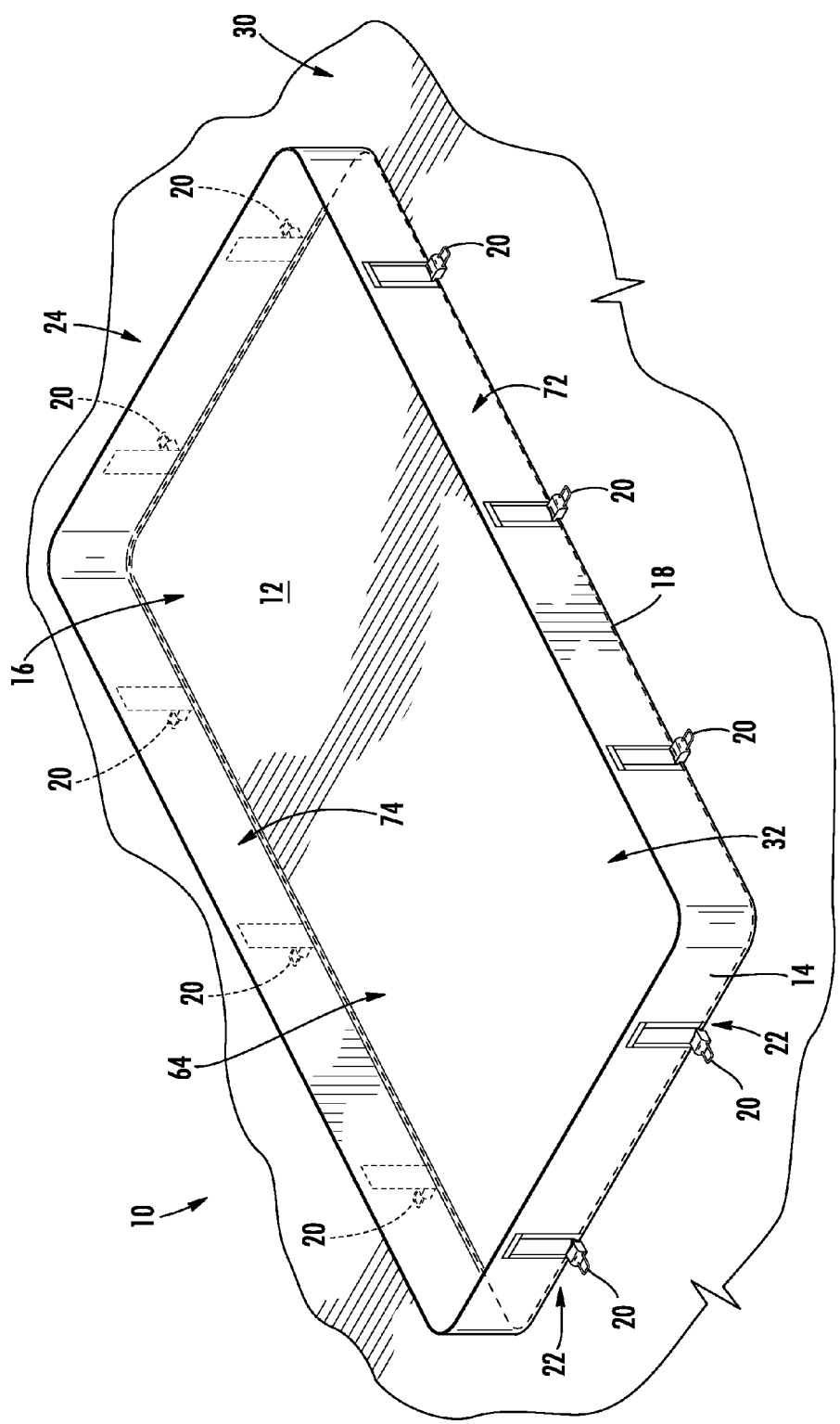
FIG. 1 is a perspective view of a fluid containment apparatus in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a fluid containment apparatus 10 that is used to hold fluid that may be released when a vehicle 82 or other objects such as storage drums are located within the fluid containment apparatus 10 and is worked upon. The present invention is also useful for applications involving mobile storage tankers. Mobile storage tankers and similar units, upon failure of a valve or seal, may result in a significant loss of the fluid contents. For example, oil that is inadvertently spilled from a tanker or during an oil change or transfer from a vehicle 82 can be contained by the apparatus 10 and prevented from damaging the ground 30, floor of a building, or other surface onto which the apparatus 10 is located. One or more wall supports 20 can be included in order to hold a side wall 14 in an upright position.

The vehicle 82 can be driven over the side wall 14 and this force may be sufficient to allow the wall support 20 to move into a collapsed position 26 along with the side wall 14 being moved to a collapsed state 28. The vehicle 82 can then be located at the center of the upper surface 64 of the floor 12 and maintenance or other procedures can be imparted thereto. The side wall 14 will remain in the collapsed state 28 even after the weight of the vehicle 82 is removed. The user may manually pull the wall support 20 back into the initial supporting position 22 so that the side wall 14 is likewise moved into an upright position. The wall support 20 may be constructed so that it can move from an initial supporting position 22 to a collapsed position 26 and back, but not beyond the initial supporting position 22.

A fluid containment apparatus 10 in accordance with one exemplary embodiment is illustrated in FIG. 1. The fluid containment apparatus 10 includes a floor 12 that is surrounded by a side wall 14. The side wall 14 may extend completely around the perimeter 18 of the floor 12, or may extend around only a portion of the perimeter of the floor 12 in other arrangements. The side wall 14 and floor 12 may be integrally formed with one another or may be separate components. Further, the side wall 14 itself and the floor 12 itself may be made of a single piece or may be formed of multiple pieces in other arrangements. The floor 12 and side wall 14 can be made of a flexible, liquid impermeable material that has good durability and chemical resistance characteristics. In accordance with one exemplary embodiment, the floor 12 and side wall 14 may both be made of a modified vinyl or polyurethane coated woven synthetic fabric. However, it is to be understood that the floor 12 and the side wall 14 can be made out of various materials in other exemplary embodiments and further may each be made out of different materials from one another.

The side wall 14 is positioned in an upright manner such that the side wall 14 and the floor 12, in particular the upper surface 64 of the floor 12, define a containment area 16 of the fluid containment apparatus 10. The containment area 16 is a space that represents the holding capacity of fluid of the fluid containment apparatus 10. Fluid may thus be dispensed into the containment area 16 and held therein. The containment area 16 has an open top 32. In this regard, the entire top of the containment area 16 is open. However, other arrangements are possible in which a top is included and covers some or all of the containment area 16. A plurality of wall supports 20 are located around the exterior of the side wall 14 and function to hold the side wall 14 in the containment position 24 as illustrated in FIG. 1. Any number of wall supports 20 can be used to hold the side wall 14 in the containment position 24. For example, from 1-5, from 6-10, from 11-30, or up to 100 wall supports 20 may be used in various exemplary embodiments. While the fluid containment apparatus 10 may have a plurality of side walls 14, only a single side wall is required to have the wall supports 20. The remaining side walls 14 may be supported by other conventional supports. In addition, only a portion of side wall 14 needs to define the wall supports 20. Other portions of side wall 14 may employ other forms of wall supports including but not limited to those as seen in U.S. Pat. Nos. 5,316,175, 5,762,233 and 6,880,720 and which are incorporated herein by reference.

Figure 2:
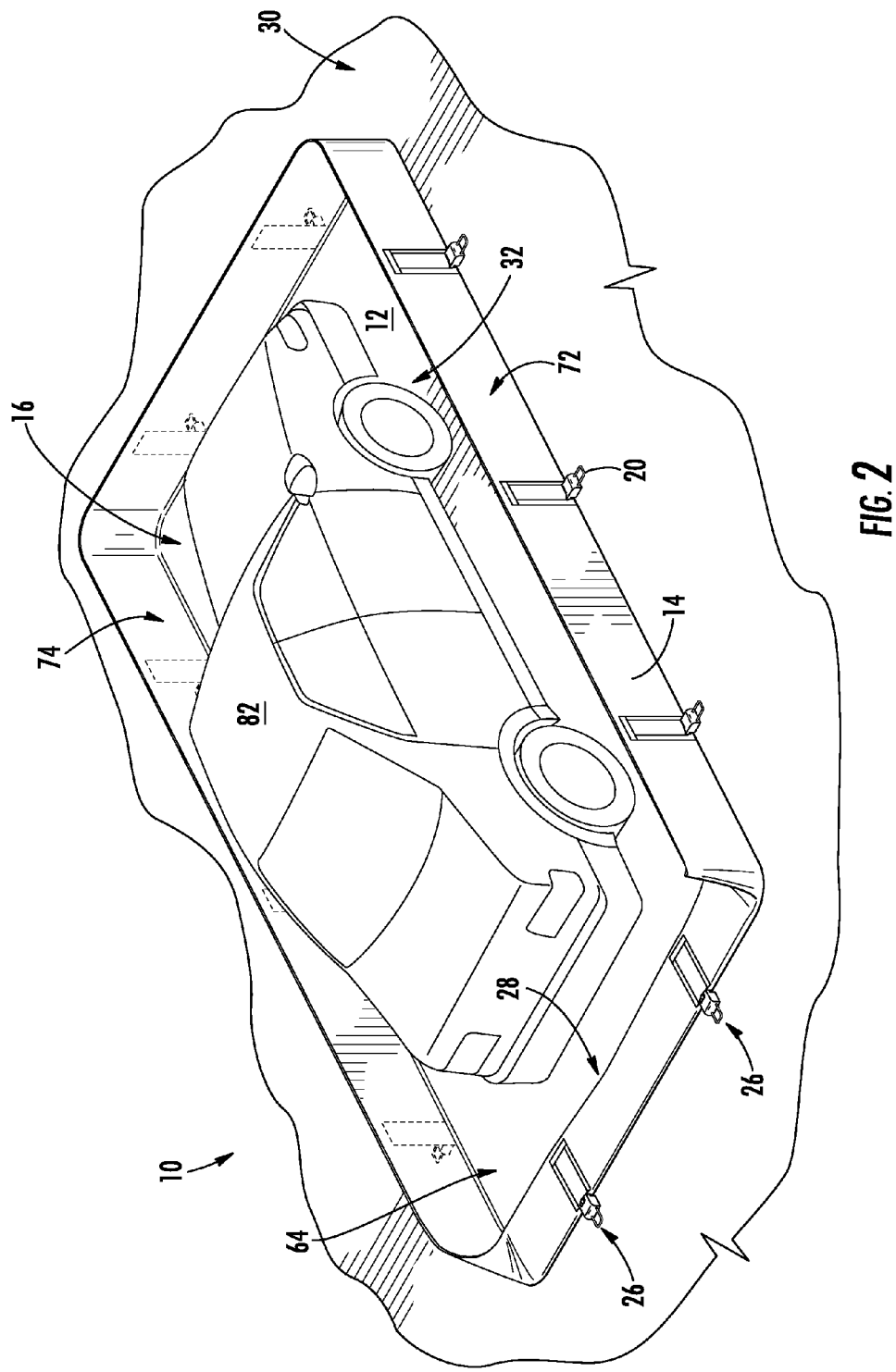
FIG. 2 is a perspective view of the fluid containment apparatus of FIG. 1 in which a side wall is lowered into a collapsed state.

In use, a vehicle 82 can be driven to a position proximate the fluid containment apparatus 10. Force can be applied to the side wall 14 and/or to one or more wall supports 20 that hold the portion of the side wall 14. This force may be exerted by a user pressing or pulling on the side wall 14 and/or the wall supports 20. Such force will cause the wall support 20 or wall supports 20 to be moved from the initial supporting position 22 illustrated in FIG. 1 to a collapsed position 26 as shown in FIG. 2. The attached side wall 14 is likewise moved to a collapsed state 28 from the containment position 24 due to the movement of the wall support 20 or wall supports 20 via the applied force. The vehicle 82 can then be driven onto the upper surface 64 of the floor 12 and located at a desired position on the floor 12. A user may subsequently apply a returning force to the wall support 20 or wall supports 20 to return them to the initial supporting position 22 shown in FIG. 1. This returning force, like the initial force, may be asserted by a user simply grasping the wall support 20 or wall supports 20 and pushing or pulling with his or her hand. Again, the side wall 14 will likewise be moved back to the containment position 24 shown in FIG. 1 upon the application of the returning force. Any portion of a single side wall 14 can be moved into the collapsed state 28 while any remaining amount of the side wall 14 remains in the initial containment position 24. In some arrangements, the entire side wall 14 is moved into the collapsed state 28. The fluid containment apparatus 10 can be manipulated so that a sufficient portion of the side wall 14 is moved to the collapsed state 28 to allow the vehicle 82 or other object to be positioned into and removed from the fluid containment apparatus 10 while the rest of the side wall 14 remains in the initial containment position 24.

Once the side wall 14 is returned back to the initial containment position 24, the maintenance procedure can be conducted on the vehicle 82 and any spilled fluid can be held within the containment area 16. Upon completion of the maintenance procedure, the fluid can be removed and a portion of the side wall 14 can be returned to the collapsed state 28 in order to allow the vehicle 82 to be driven or otherwise pushed from the floor 12. The user may manually apply sufficient force to cause the wall support 20 to be moved to the collapsed position 26 and hence allow the side wall 14 to be moved to the collapsed state 28 to facilitate removal of the vehicle 82.

All of the wall supports 20 of the fluid containment apparatus 10 may be capable of moving from an initial supporting position 22 to a collapsed position 26 and back. Alternatively, only some of the wall supports 20 may be capable of this repositioning while the rest of the wall supports 20 are not capable of the described repositioning. For example, the fluid containment apparatus 10 may be designed so that the vehicle 82 is to enter and leave from a single side of the apparatus 10. In this regard, the wall supports 20 holding up this single side of the apparatus 10 may be capable of repositioning while the rest of the wall supports 20 are not capable of repositioning because the portions of the side wall 14 held by these wall supports 20 do not need to collapse. In other arrangements, the wall supports 20 at opposite ends of the apparatus 10 may be capable of being repositioned to allow the vehicle 82 to enter and exit at either end. As such, it is to be understood that all of the wall supports 20 may be made in an identical manner to one another in some embodiments, while in other embodiments not all of the wall supports 20 are made in the same way.

Figure 3:
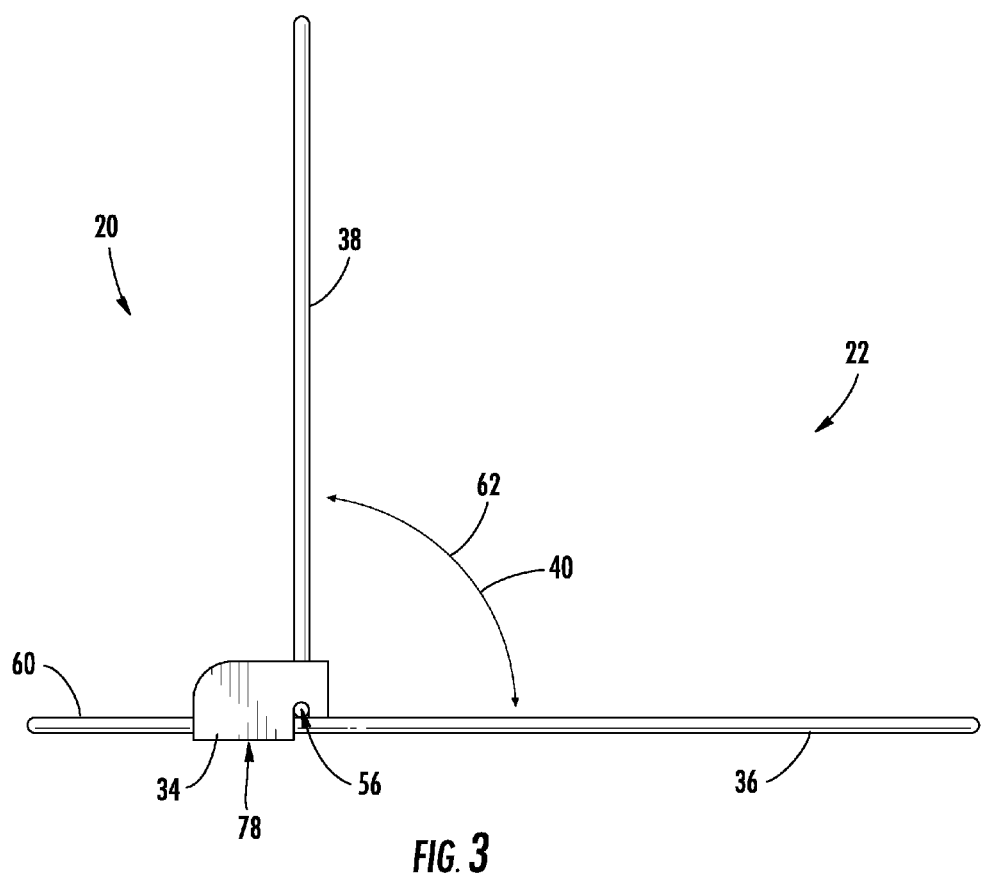
FIG. 3 is a side view of a wall support in accordance with one exemplary embodiment.
Figure 4:
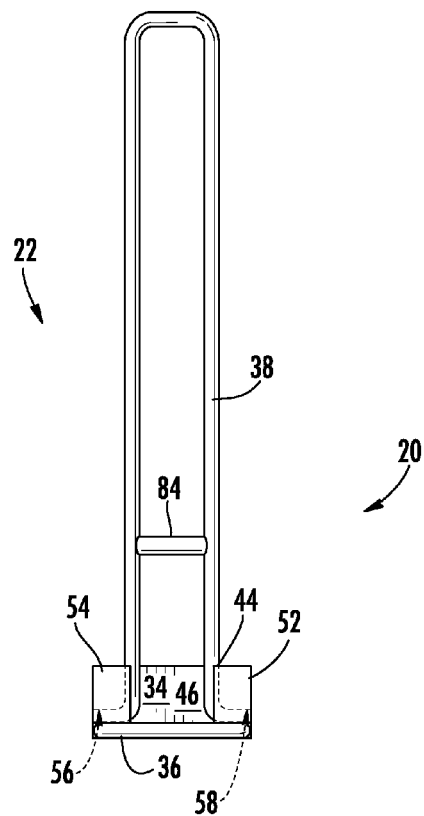
FIG. 4 is a front view of the wall support of FIG. 3.
Figure 5:
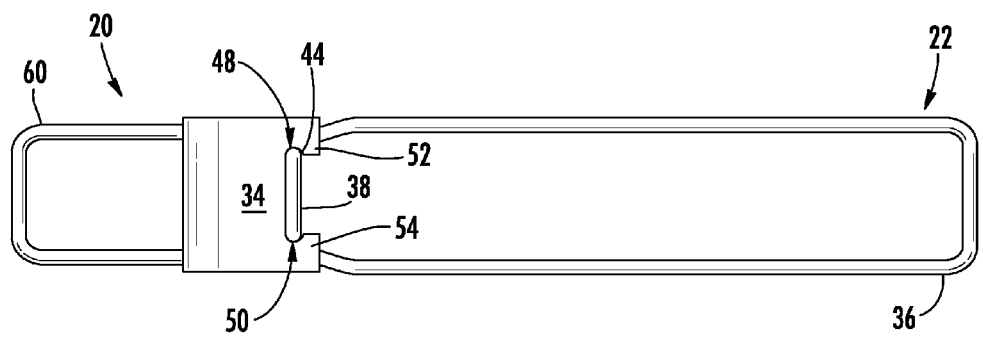
FIG. 5 is a top view of the wall support of FIG. 3.

One exemplary embodiment of a wall support 20 is shown with reference to FIGS. 3-5. Here, the wall support 20 is shown in the initial supporting position 22. The wall support 20 includes a base 34 that can be made of a plastic material that is generally rigid while allowing for some amount of flexibility. The base 34 may be made of polyethylene or polyurethane in accordance with certain exemplary embodiments. However, it is to be understood that the base 34 can be made out of various materials. An inner support leg 36 may extend from the base 34 and can be arranged so that it does not move or pivot with respect to the base 34. The inner support leg 36 may be made of metal such as aluminum or steel and can have a circular cross-section and a generally u-shape such that it defines with the base 34 a central opening. This construction need not be present in other embodiments in which the inner support leg 36 can be a single solid piece without the presence of a defined central opening. The inner support leg 36 may be attached to the base 34 by way of a casting process such that the base 34 is cast around the inner support leg 36. However, other arrangements are possible in which the base 34 can be attached to the inner support leg 36 in a variety of manners. An outer support leg 60 may also be included and is attached to the base 34 such that the base 34 and outer support leg 60 do not move relative to one another. The outer support leg 60 may extend from the base 34 in a direction that is completely opposite to the direction of extension of the inner support leg 36 from the base 34. The outer support leg 60 can be constructed and arranged in manners similar to the inner support leg 36 previously discussed and a repeat of this information is not necessary. In some embodiments, the inner support leg 36 and the outer support leg 60 may be a single, integral piece. In other arrangements, the legs 36 and 60 along with the base 34 may be a single, integral piece.

The wall support 20 includes a pivoting leg 38 that pivotally engages the base 34 such that the pivoting leg 38 can move with respect to the base 34, inner support leg 36, and outer support leg 60. The pivoting leg 38 can be u shape so that a central aperture is defined by the pivoting leg 38 and the base 34. A reinforcing cross-brace 84 can extend between the u-shaped portion of the pivoting leg 38 in order to strengthen the pivoting leg 38 at this location and/or to ensure the desired amount of bending and bending location of the pivoting leg 38 is achieved as desired. Although a single reinforcing cross-brace 84 is disclosed, any number or none at all may be used in various exemplary embodiments.

The pivoting leg 38 may also have a circular cross-sectional shape. However, the pivoting leg 38 may be variously configured in accordance with other exemplary embodiments of the fluid containment apparatus 10. The pivoting leg 38 may be made of a metal such as steel or aluminum, or may be made of plastic in certain exemplary embodiments. The base 34 may define a pair of curved horizontal receiving surfaces 56 and 58. The end portions of the pivoting leg 38 may each have curved outer surfaces and may each be received onto the curved horizontal receiving surfaces 56 and 58. The ends of the pivoting leg 38 may rest on top of the inner support leg 36 so that they are retained onto the base 34 and are not allowed to fall out of the cavities defined by the curved horizontal receiving surfaces 56 and 58. The engagement formed between the base 34, inner support leg 36, and the pivoting leg 38 is a pivot engagement in that the pivoting leg 38 is held onto the base 34 and inner support leg 36 yet allowed to pivot with respect to these components. However, it is to be understood that the pivoting leg 38 can be variously arranged with respect to the base 34 so as to be allowed to pivot with respect to the base 34 and that the disclosed arrangement is only one possible option.

The pivoting leg 38 is retained into a detent 44 of the base 34. The detent 44 functions to hold the pivoting leg 38 in the initial supporting position 22 illustrated in FIGS. 3-5. The detent 44 is at least partially defined by a wall 46 of the base 34. The detent 44 also includes a pair of curved vertical recess surfaces 48 and 50 that may extend to the upper surface of the base 34. The pivoting leg 38 may be arranged such that it engages both of the curved vertical recess surfaces 48 and 50. The pivoting leg 38 may have a curved outer surface that is complimentary to the curvature of the curved vertical recess surfaces 48 and 50. The detent 44 may also include a pair of lips 52 and 54 that extend towards one another and extend beyond at least a portion of the pivoting leg 38 as may be more clearly seen with reference to FIG. 4. As disclosed, the lips 52 and 54 include material of the base 34 whose position inhibit pivoting leg 38 from being released from the detent 44. With the disclosed arrangement, the pivoting leg 38 is held in the initial supporting position 22 and is not allowed to pivot with respect to the base 34.

However, once it is desired to move the wall support 20 to the collapsed position 26, the detent 44 and pivoting leg 38 are arranged to accommodate such repositioning. Application of a sufficient amount of force to the pivoting leg 38, for example upon being acted upon by the weight of a vehicle 82, causes the pivoting leg 38 to be snapped out of the detent 44 and subsequently allowed to pivot with respect to the base 34. The sufficient amount of force may function to compress the lips 52 and 54 thus allowing the pivoting leg 38 to have room sufficient to be forced beyond the lips 52 and 54 and hence out of the detent 44. In this arrangement, the base 34 can be made of a material that has some degree of inherent flexibility to allow the lips 52 and 54 to flex an amount to allow the pivoting leg 38 to pass.

Alternatively, the u-shaped construction of the pivoting leg 38 may allow the pivoting leg 38 to compress upon the application of the sufficient amount of force. In this regard, the curved vertical recess surfaces 48 and 50 in addition to, or alternatively to, the lips 52 and 54 may have a wedge or inclined shape that facilitates the removal and insertion of the pivoting leg 38 into and out of the detent 44. The oppositely disposed portions of the pivoting leg 38 may be moved towards one another upon the application of the sufficient amount of force and the pressing of the pivoting leg 38 against the surfaces 48 and 50 and/or lips 52 and 54. In this regard, the central opening defined by the u-shaped pivoting leg 38 may become smaller due to the flexing of the opposite portions of the pivoting leg 38 to one another. The pivoting leg 38 can then be moved beyond the lips 52 and 54 and out of the detent 44. The shape of the pivoting leg 38 allows it to flex. In other arrangements of the wall support 20, the pivoting leg 38 may be removed from the detent 44 via a combination of both flexing of the lips 52 and 54 and flexing of the pivoting leg 38.

Once removed from the detent 44, the pivoting leg 38 is free to be pivoted with respect to the base 34 and the inner support leg 36. The pivoting leg 38 may be capable of pivoting to the inner support leg 36 and may be capable of touching the inner support leg 36. In order to return the pivoting leg 38 to the initial supporting position 22, a return force can be applied that is sufficient to reinsert the pivoting leg 38 back into the detent 44. The same mechanisms, flexing of the lips 52 and 54 in addition to or alternatively to flexing of the pivoting leg 38, may be employed to return the pivoting leg 38 to the detent 44.

Other mechanisms or arrangements between the pivoting leg 38 and the base 34 can be employed to maintain the orientation between these components and to also allow these components to move with respect to one another. For example, the lips 52 and 54 could be removed or could be modified so that they incorporate spring loaded detent pins or balls. The pivoting leg 38 and portions of the base 34, such as the lips 52 and 54 if present, need not flex or move. The initial, stationary position of the pivoting leg 38 can be maintained with respect to the base 34 as the spring loaded detent pins or balls will prevent the pivoting leg 38 from pivoting downward. However, the application of a sufficient amount of force to the pivoting leg 38 will cause the spring loaded detent pins or balls to be recessed into the base 34. The pivoting leg 38 will then move past the spring loaded detent pins or balls and down into its collapsed position. With such an arrangement, the plastic or other material making up the base 34 and the pivoting leg 38 do not have to flex when movement of the pivoting leg 38 out of or into the supporting position is desired. The only portions that would "flex" would be the spring loaded detent pins or balls and these would simply move in or out as necessary.

With reference now to FIG. 3, the pivoting leg 38 is located at an angle 40 that is 90° to the inner support leg 36. However, in the initial supporting position 22, the angle 40 may be different in other exemplary embodiments. For example, the angle 40 may be 85°, 80°, 95°, 100°, 105°, from 75° to 120°, or up to 150° in accordance with other exemplary embodiments of the fluid containment apparatus 10. The deployed angle 40 may be any angle that provides for sufficient deployment of the side wall(s) 14 so as to maintain the fluid containment apparatus 10 in a fluid containing position. The wall 46 acts to limit the pivoting range 62 of the pivoting leg 38 with respect to the base 34. In this regard, the pivoting leg 38 engages the wall 46 and is prevented from moving beyond the wall 46. The wall 46 may be a vertical wall in one exemplary embodiment thus preventing the pivoting leg 38 from moving beyond a vertical orientation. The wall 46 or other mechanism designed to limit the pivoting range 62 of the pivoting leg 38 may function as a block or stop to counteract pressure forces of the fluid in the containment area 16 acting to expand the side wall 14 outwards. In this regard, pressure forces acting against the pivoting leg 38 may cause the pivoting leg 38 to be forced against the wall 46 thus causing the wall 46 to prevent further pivoting of the pivoting leg 38 and hence counter act the imparted pressure.

Figure 6:
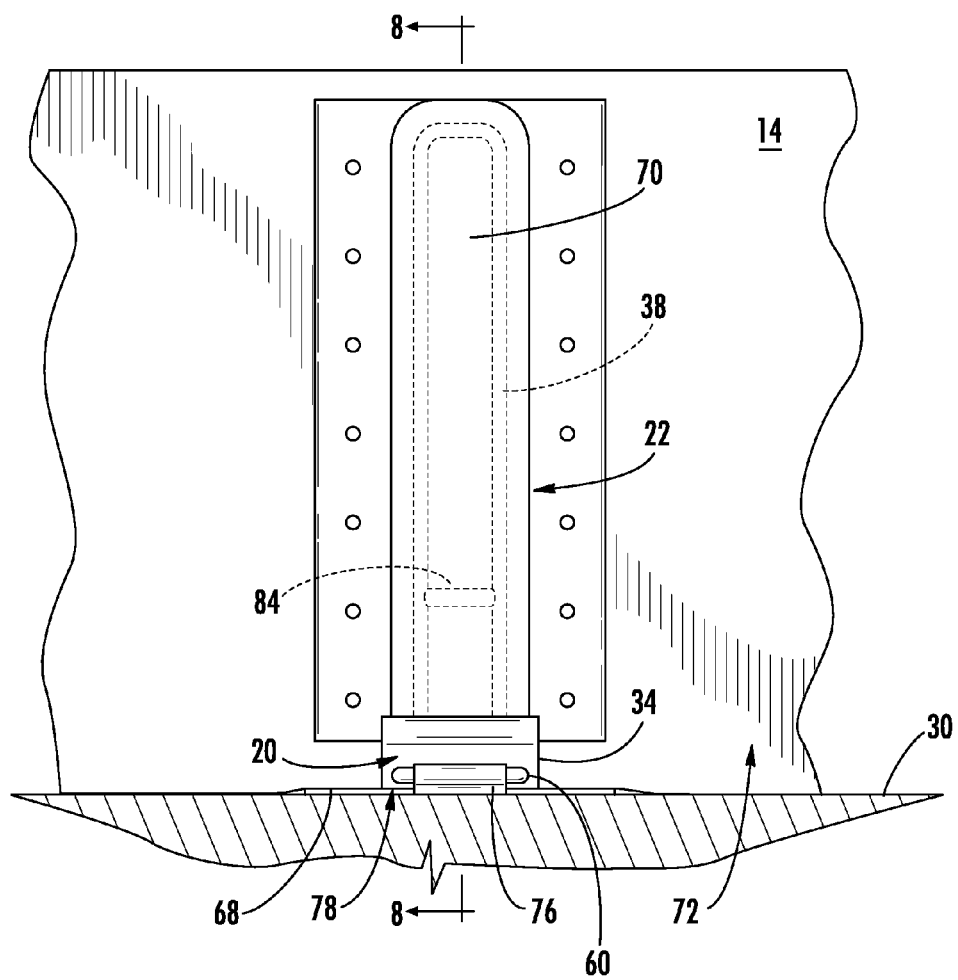
FIG. 6 is a back view of a portion of a fluid containment apparatus that includes a wall support in accordance with one exemplary embodiment.

FIG. 6 shows the wall support 20 engaged with the side wall 14. A side pocket 70 is included and is defined on the exterior surface 72 of the side wall 14. The side pocket 70 may be a piece of material that is attached to the exterior surface 72 and is open at a bottom end. The side pocket 70 may be attached in a variety of manners. For example, the side pocket 70 may be attached to the side wall 14 through stitching, adhesion, or through the application of heat and pressure. In other arrangements the side pocket 70 and the side wall 14 may be an integral piece. The side pocket 70 may be sealed at its sides and top so that the only opening into or out of the side pocket 70 is at the bottom. The pivoting leg 38 may be inserted into the side pocket 70 through the open bottom and can be retained therein. The pivoting leg 38 may thus be completely covered by the side pocket 70 and side wall 14 so that it cannot be seen during use. In some instances, the portion of the pivoting leg 38 proximate to the base 34 is visible. Although described as being removably attached to the side wall 14, the pivoting leg 38 can be permanently attached to the side wall 14 in other exemplary embodiments. The pivoting leg 38 functions to hold the side wall 14 in a vertical orientation. Forces that act on the side wall 14 will be counteracted by the support of the pivoting leg 38 to maintain the side wall 14 in the containment position 24. However, as previously discussed when a sufficient amount of force is applied to the pivoting leg 38 in a particular direction the pivoting leg 38 will move so as to cause a resulting movement of the side wall 14.

The base 34 is located proximate to and faces the exterior surface 72 of the side wall 14. In fact, the entire wall support 20 is located outside of the containment area 16 when incorporated into the fluid containment apparatus 10. In this instance, no portion of the wall support 20 directly faces the upper surface 64 of the floor 12 or directly faces the interior surface 74 of the side wall 14. However, it is to be understood that other arrangements are possible in which one or more portions of the wall support 20 do in fact directly face the interior surface 74 and/or the upper surface 64 and are located within the containment area 16.

Figure 7:
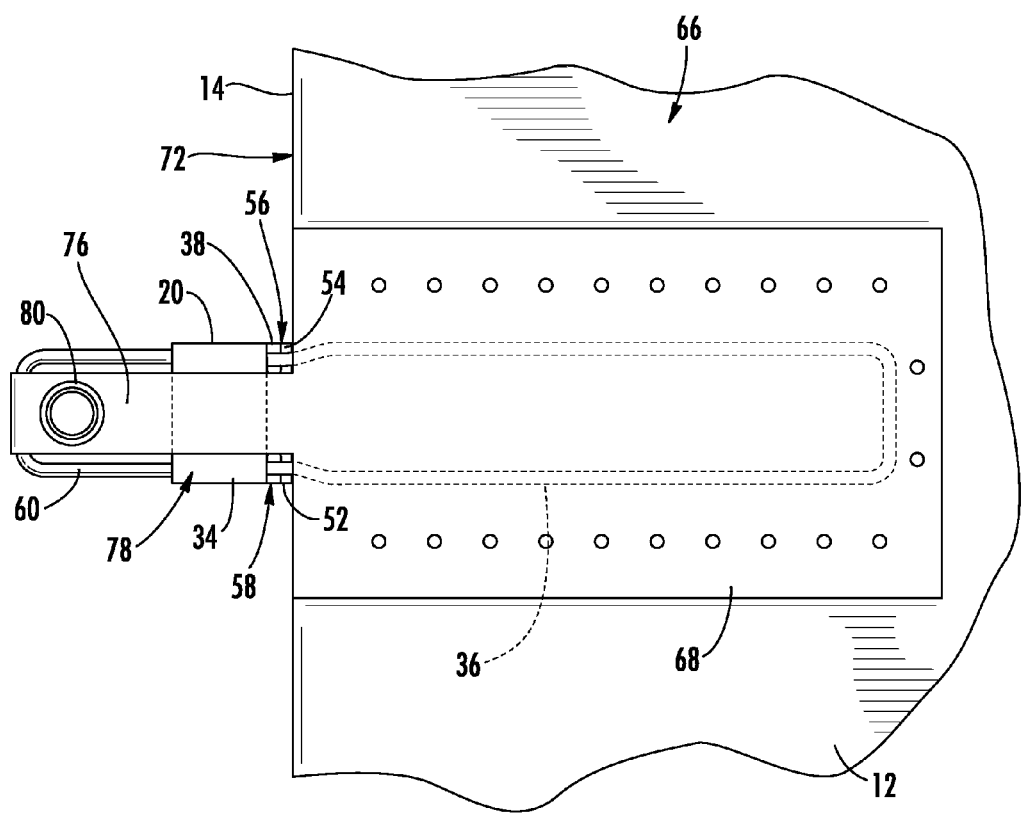
FIG. 7 is a bottom view of a portion of a fluid containment apparatus that includes a wall support in accordance with one exemplary embodiment.

With reference now to FIG. 7, a bottom view of a portion of the fluid containment apparatus 10 is illustrated that shows a bottom pocket 68 located on a lower surface 66 of the floor 12. The bottom pocket 68 may be opened on an end that faces towards the side wall 14. The bottom pocket 68 can be located on the lower surface 66 so that it is set inwards from the side wall 14 so that some amount of the lower surface 66 without the bottom pocket 68 is present between the bottom pocket 68 and the side wall 14. The bottom pocket 68 can be closed on all of its ends other than the open end that faces generally in the direction of the proximate side wall 14. The bottom pocket 68 may be made of the same material as the floor 12 and/or side wall 14 or can be made out of a different material. The bottom pocket 68 can be arranged and attached in the same manners as the side pocket 70 previously discussed and a repeat of this information is not necessary. The inner support leg 36 may be disposed within the bottom pocket 68 and held therein. The inner support leg 36 engages the lower surface 66, and can be removed from the bottom pocket 68 or may be configured so as to be permanently attached to the floor 12.

The base 34 directly faces the exterior surface 72 of the side wall 12, and the end of the base 34 may in some instances contact the exterior surface 72. As disclosed in FIG. 7, the ends of the lips 52 and 54 of the base 34 in fact engage the exterior surface 72. However, it is to be understood that this engagement is not present in other exemplary embodiments. An attachment strap 76 extends from the bottom pocket 68. The attachment strap 76 can be integrally formed with the bottom pocket 68 and may be made of the same material. It is to be understood, however, that the attachment strap 76 need not be integrally formed with the bottom pocket 68 or may be attached to a portion of the floor 12 and/or side wall 14 other than at the bottom pocket 68. The attachment strap 76 is located under the base 34 and engages the bottom surface 78 of the base 34. As such, the attachment strap 76 engages the bottom surface 78 on one side and the ground 30 on another. The base 34 may thus not engage the ground 30 in certain arrangements. The attachment strap 76 may have a width that is less than or equal to the width of the base 34. All of the portion of the attachment strap 76 that extends beyond the side wall 14 may be narrower than the portions of the wall support 20 that it engages such as the outer support leg 60, the base 34 and/or the inner support leg 36. As such, the apparatus 10 may not have a skirt that surrounds the perimeter of the side wall 14. However, it is to be understood that other arrangements are possible in which a skirt is incorporated into the apparatus 10.

The attachment strap 76 extends around the terminal end of the outer support leg 60 and back towards the base 34. An aperture snap 80 can be included on the attachment strap 76 which may be fastened by the user. The aperture snap 80 can be a mechanical fastener that is button like in shape but has an aperture through the center such as a grommet. The attachment strap 76 is thus attached to the outer support leg 60. It is to be understood that the attachment strap 76 can be connected to the outer support leg 60 in a variety of manners and that the use of an aperture snap 80 is but one example. Further, the attachment strap 76 need not be attached to the outer support leg 60 or even be present in other embodiments of the fluid containment apparatus 10.

A stake or other member can be inserted through the aperture of the aperture snap 80 in order to secure the wall support 20 to the ground or other structure. Engagement by the attachment strap 76 and insertion of the pivoting leg 38 and inner support leg 36 into the side pocket 70 and the bottom pocket 68 facilitates attachment of the wall support 20 to the side wall 14 and floor 12 and functions to anchor the wall support 20 to these components. The wall support 20 can be removed from the floor 12 and side wall 14 so that the fluid containment apparatus 10 can be rolled up for storage or transport to a different location. In other arrangements, the wall support 20 can be permanently attached to the floor 12 and side wall 14 and may be folded up within the fluid containment apparatus 10.

The inner support leg 36 need not be removable from the bottom pocket 68 in other arrangements. Additionally, the pivoting leg 38 need not be removable from the side pocket 70 in other exemplary embodiments. The bottom pocket 68 and the side pocket 70 can be heat welded so as to capture the inner support leg 36 and pivoting leg 38 therein to render these components non-removable. Further, the outer support leg 60 and attachment strap 76 need not be present in certain exemplary embodiments. The pivoting leg 38 and the inner support leg 36 can be removable or non-removable from the pockets 70 and 68 when the outer support leg 60 and attachment strap 76 are not present.

Figure 8:
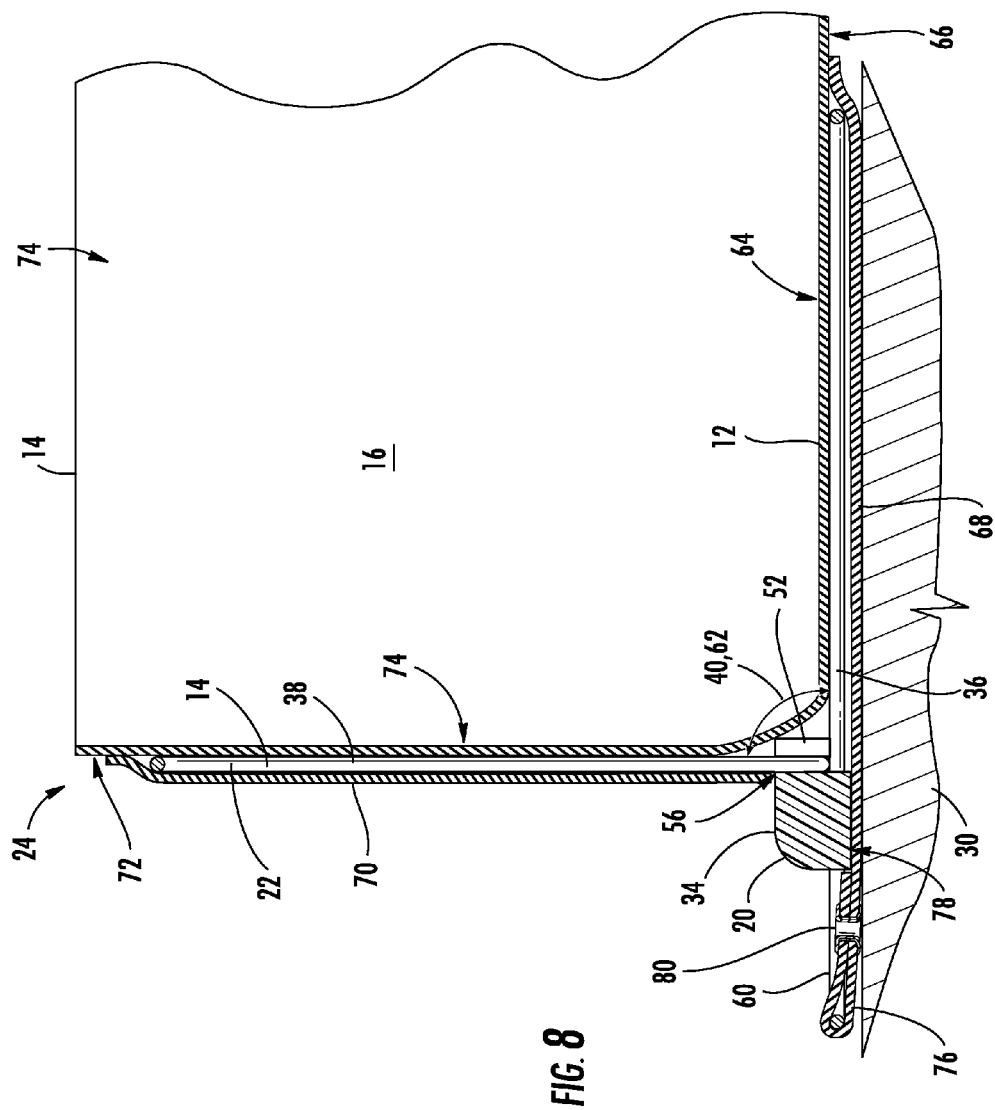
FIG. 8 is a cross-sectional view taken along line 8-8 of FIG. 6.
Figure 9:
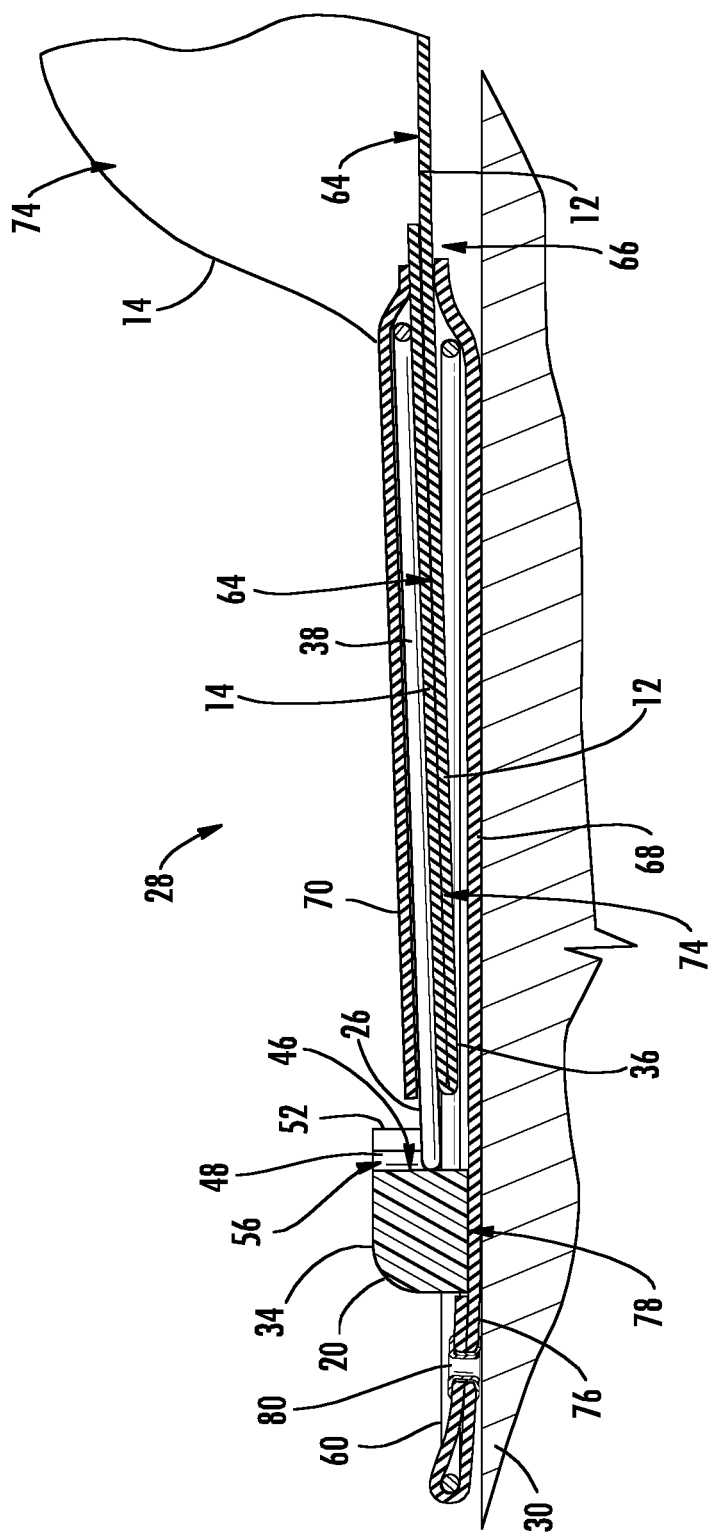
FIG. 9 is a cross-sectional view of a fluid containment apparatus in which the wall support is oriented in a collapsed position, and in which the side wall is oriented in a collapsed state.

FIG. 8 shows a cross-sectional view taken along line 8-8 in FIG. 6 of a portion of the fluid containment apparatus 10 that includes the wall support 20 in the initial supporting position 22. FIG. 9 shows a similar cross-sectional view in which the pivoting leg 38 is pivoted to a collapsed position 26 and in which the side wall 14 is moved into a collapsed state 28. The pivoting range 62 may be from 0°-90°, from 0°-100°, from 0°-75°, 0°-120° or from 0°-150° between the initial supporting position 22 and the collapsed position 26 in accordance with certain exemplary embodiments. The pivoting range 62 may be less than 180°, less than 170°, or less than 160° in yet additional exemplary embodiments. As such, certain exemplary embodiments exist in which the pivoting leg 38 is not capable of being pivoted 180°. Further, the pivoting leg 38 may not be capable of being pivoted beyond the vertical orientation as shown in FIG. 8 in a direction away from the upper surface 64 of the floor 12. In this regard, the pivoting leg 38 may be able to pivot towards the upper surface 64 but cannot pivot away from the upper surface 64 to an extent beyond the vertical orientation.

Upon being moved to the collapsed state 28 as shown in FIG. 9, the side wall 14 is located against the floor 12 such that the interior surface 74 of the side wall 14 engages the upper surface 64 of the floor 12. The pivoting leg 38 may be completely parallel to the inner support leg 36 or may extend at an angle thereto due to the thickness of the side wall 14 and the floor 12 located between the legs 36 and 38. The pivoting leg 38 may remain inside of the side pocket 70 even when moved to the collapsed position 26. Once the force necessary to pivot the pivoting leg 38 to the collapsed position 26 has been removed, the pivoting leg 38 and the side wall 14 may remain in the positions shown in FIG. 9. The pivoting leg 38 is unbiased and will not function to move to a particular position. Frictional engagement between the pivoting leg 38 and the lips 52 and 54 of the base 34 may function to control the ease of pivoting of the leg 38 with respect to the base 34 so that some amount of force is necessary to pivot the leg 38. If force is removed, the pivoting leg 38 may remain in a particular position with respect to the base 34 due to the frictional engagement between the pivoting leg 38 and the lips 52 and 54. Some amount of force may be necessary to further effect pivoting of the pivoting leg 38.

In order to return the pivoting leg 38 and the side wall 14 to the orientation shown in FIG. 8 from that shown in FIG. 9, the user must apply some amount of returning force to the pivoting leg 38 as the pivoting leg 38 is not inherently biased to the initial supporting position 22. The user may manually grasp the side pocket 70, pivoting leg 38, and side wall 14 and lift these portions upwards and away from the upper surface 64 of the floor 12. Other types of force may be used instead of manual lifting by the user to cause this return. A sturdier and more robust design may exist when some type of force must be applied to the pivoting leg 38 in order to affect its return. The fluid containment apparatus 10 is thus capable of retaining fluid within the containment area 16 when the side wall 14 is in the containment position 24, and is capable of allowing a vehicle 82 or other object to be moved onto and off of the floor 12 by way of having the side wall 14 fold down to allow such entry and exit.

Although shown and described as being on the exterior of the floor 12 and side wall 14, it is to be understood that other arrangements are possible in which the wall support 20 directly faces or engages the interior surface 74 of the side wall and/or the upper surface 64 of the floor 12. The wall support 20 may be located in the containment area 16 in accordance with other exemplary embodiments of the fluid containment apparatus.

A second exemplary embodiment of a wall support 120 is shown with reference to FIGS. 10-13. For clarity, analogous features shown and described on other embodiments are hereby referenced and similar details of construction and operation need not be repeated in detail. Here, the wall support 120 is shown in the initial supporting position 122. The wall support 120 includes a base 134 that can be made of a plastic material that is generally rigid while allowing for some amount of flexibility. The base 134 may be made of polyethylene or polyurethane in accordance with certain exemplary embodiments. However, it is to be understood that the base 134 can be made out of various materials. An inner support leg 136 may extend from the base 134 and can be arranged so that it does not move or pivot with respect to the base 134. The inner support leg 136 may be made of metal such as aluminum or steel and can have a circular cross-section and a generally u-shape such that it defines with the base 134 a central opening. This construction need not be present in other embodiments in which the inner support leg 136 can be a single solid piece without the presence of a defined central opening. The inner support leg 136 may be attached to the base 134 by way of a casting process such that the base 134 is cast around the inner support leg 136. However, other arrangements are possible in which the base 134 can be attached to the inner support leg 136 in a variety of manners. An outer support leg 160 may also be included and is attached to the base 134 such that the base 134 and outer support leg 160 do not move relative to one another. The outer support leg 160 may extend from the base 134 in a direction that is completely opposite to the direction of extension of the inner support leg 136 from the base 134. The outer support leg 160 can be constructed and arranged in manners similar to the inner support leg 136 previously discussed and a repeat of this information is not necessary. In some embodiments, the inner support leg 136 and the outer support leg 160 may be a single, integral piece and may either singly of collectively be provide from pieces of solid metal, plastic or elastomeric materials. In other arrangements, the legs 136 and 160 along with the base 134 may be a single, integral piece.

The wall support 120 includes a pivoting leg 138 that pivotally engages the base 134 such that the pivoting leg 138 can move with respect to the base 134, inner support leg 136, and outer support leg 160. The pivoting leg 138 can be u-shape so that a central aperture is defined by the pivoting leg 138 and the base 134. A reinforcing cross-brace 184 can extend between the u-shaped portion of the pivoting leg 138 in order to strengthen the pivoting leg 138 at this location and/or to ensure the desired amount of bending and bending location of the pivoting leg 138 is achieved as desired. Although a single reinforcing cross-brace 184 is disclosed, any number or none at all may be used in various exemplary embodiments. As the length of the pivoting leg 138 or inner support leg 136 is varied, the presence or number of braces may vary. In embodiments where legs 136 or 138 may be formed from a solid piece of material such as a metal or plastic bar, no cross brace would be needed.

Figure 10:
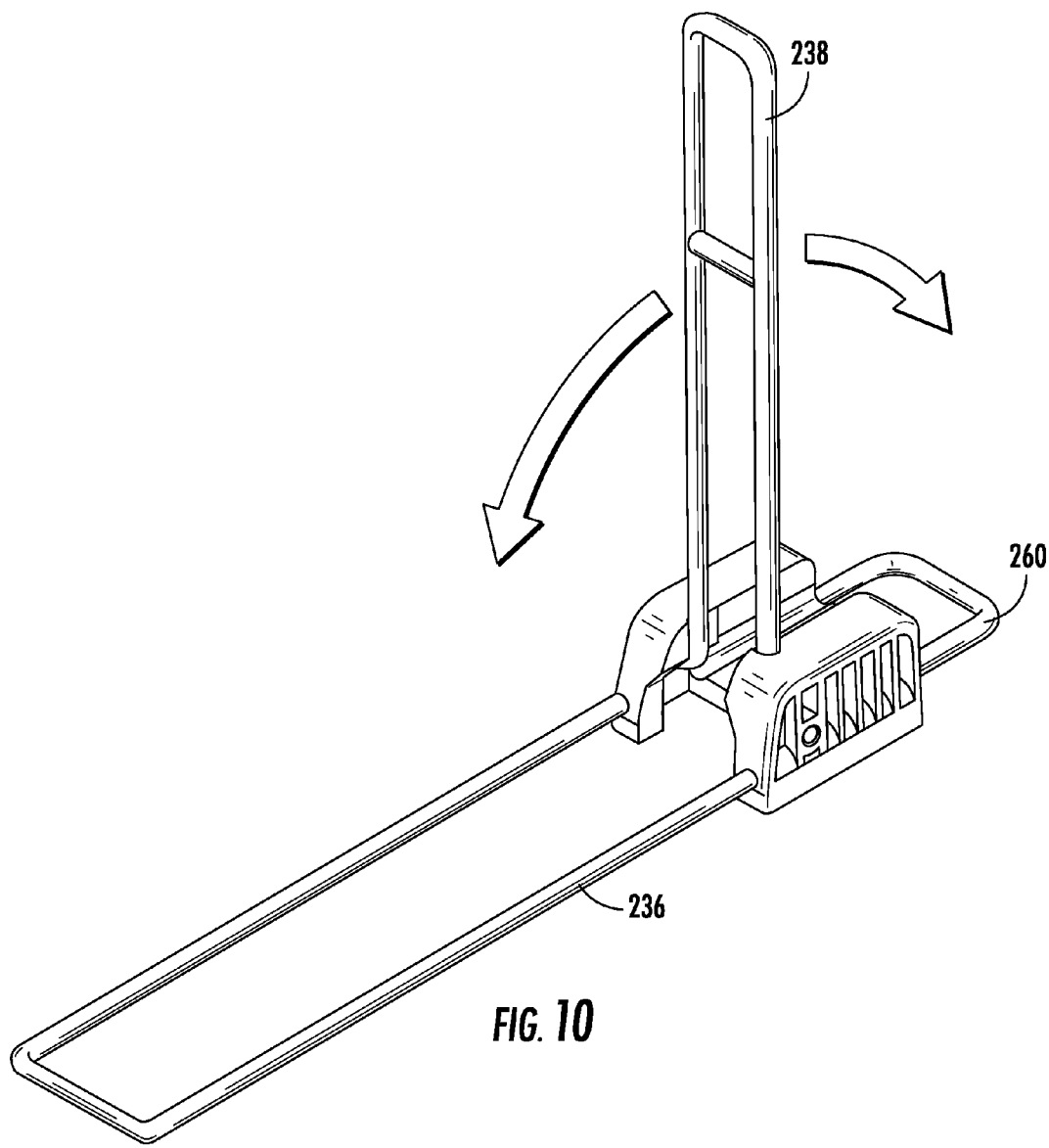
FIGS. 10-13 are perspective views of an additional embodiment of a wall support.
Figure 11:
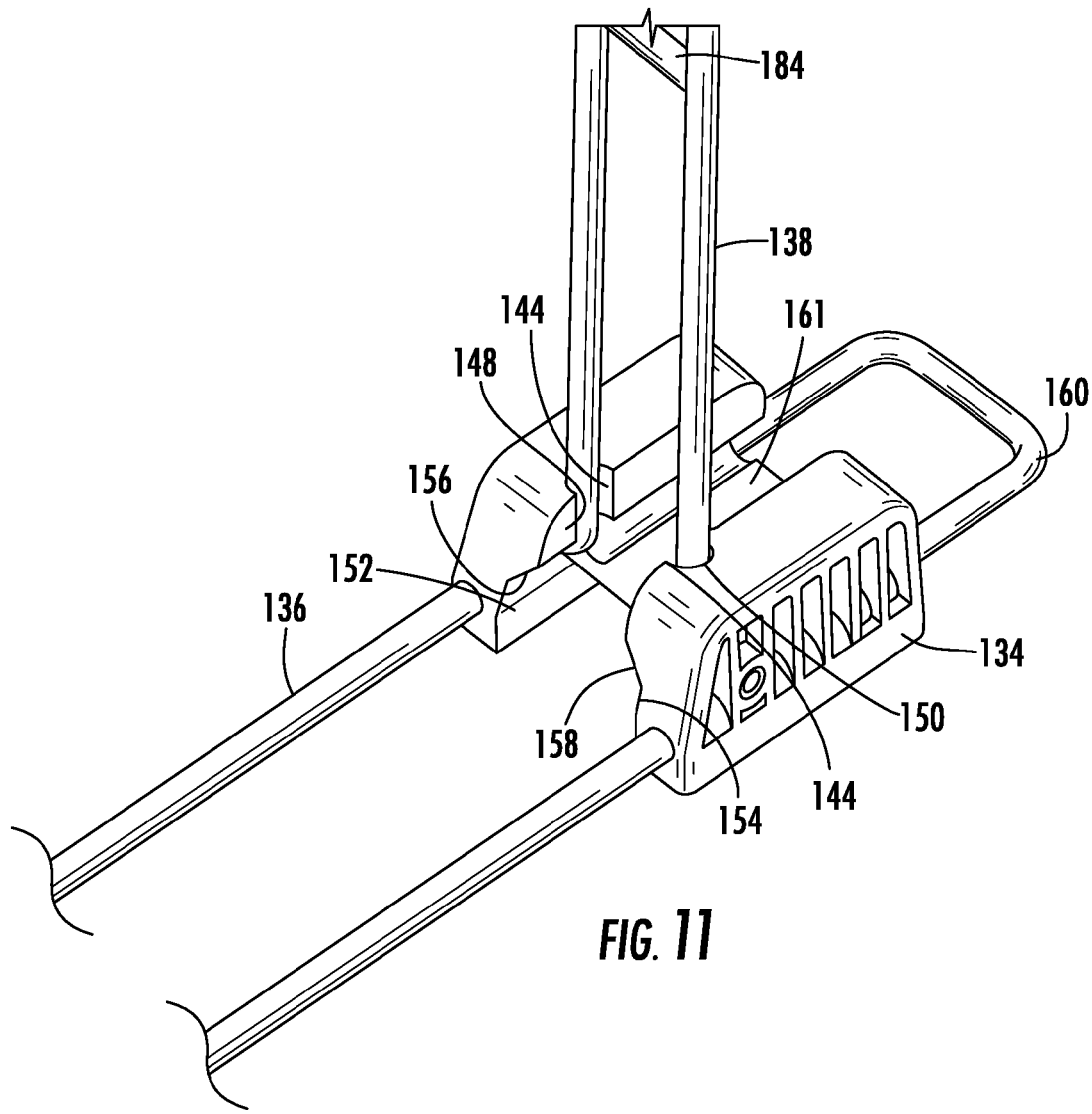
Figure 12:
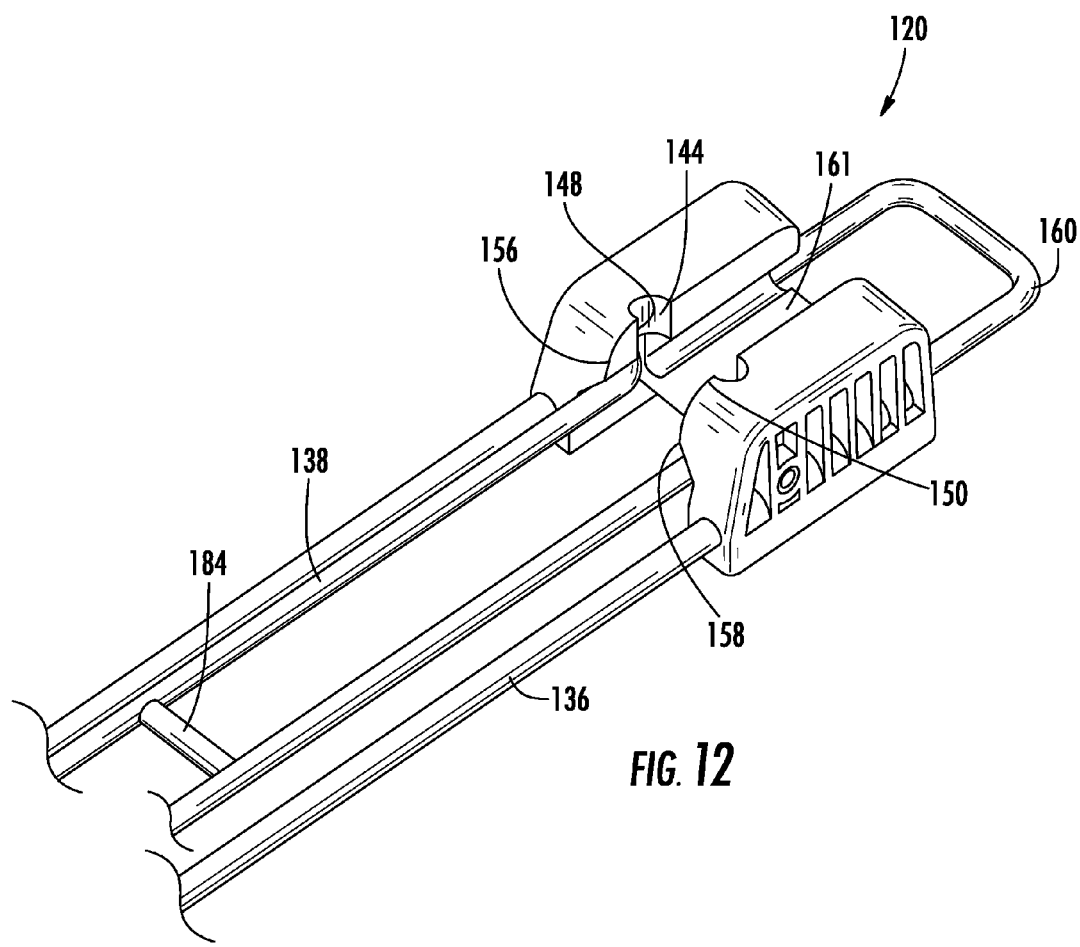
Figure 13:
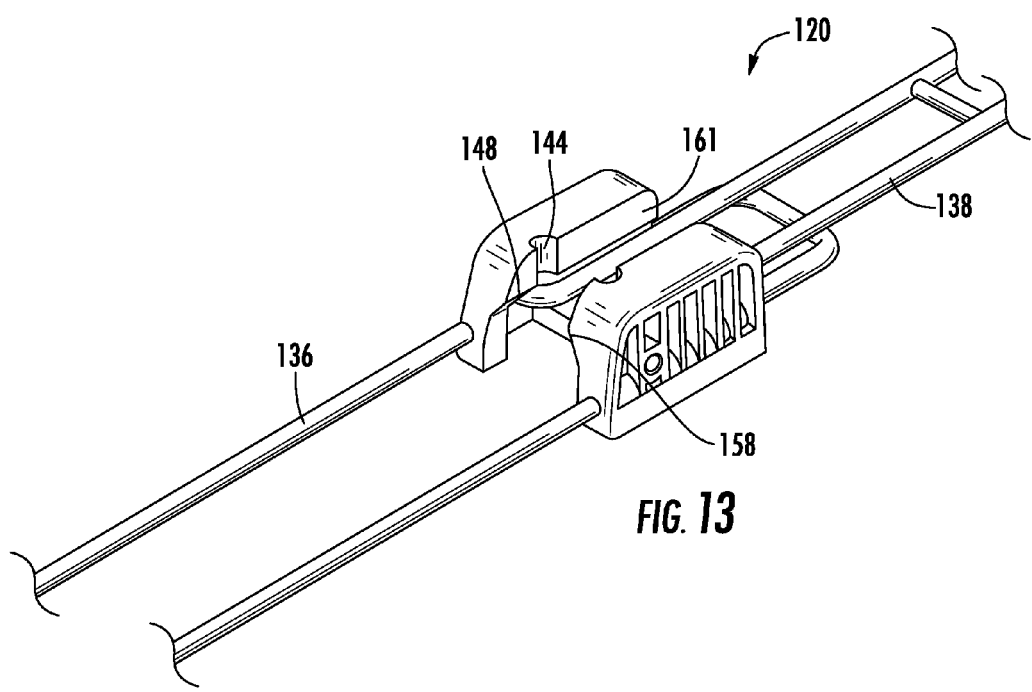
Figure 14:
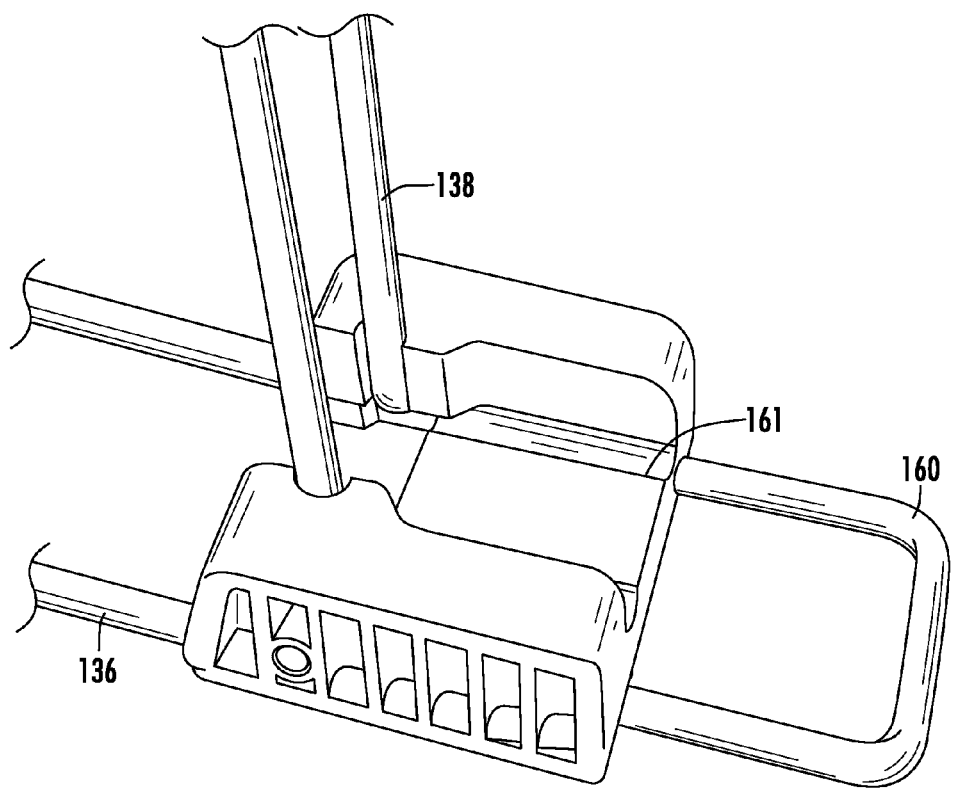
FIGS. 14-15 are perspective views of an alternative embodiment of a wall support.

The pivoting leg 138 may also have a circular cross-sectional shape. However, the pivoting leg 138 may be variously configured in accordance with other exemplary embodiments of the fluid containment apparatus 10. The pivoting leg 138 may be made of a metal such as steel or aluminum, or may be made of plastic in certain exemplary embodiments. The base 134 may define a pair of curved horizontal receiving surfaces 156 and 158. The end portions of the pivoting leg 138 may each have curved outer surfaces and may each be received onto the curved horizontal receiving surfaces 156 and 158. The ends of the pivoting leg 138 may rest on top of the inner support leg 136 so that they are retained onto the base 134 and are not allowed to fall out of the cavities defined by the curved horizontal receiving surfaces 156 and 158. The engagement formed between the base 134, inner support leg 136, and the pivoting leg 138 is a pivot engagement in that the pivoting leg 138 is held onto the base 134 and inner support leg 136 yet allowed to pivot with respect to these components. However, it is to be understood that the pivoting leg 138 can be variously arranged with respect to the base 134 so as to be allowed to pivot The pivoting leg 138 is retained into a detent 144 of the base 134. The detent 144 functions to hold the pivoting leg 138 in the initial supporting position 122 illustrated in FIG. 12. The detent 144 is at least partially defined by a wall 146 of the base 134. The detent 144 also includes a pair of curved vertical recess surfaces 148 and 150 that may extend to the upper surface of the base 134. The pivoting leg 138 may be arranged such that it engages both of the curved vertical recess surfaces 148 and 150. The pivoting leg 138 may have a curved outer surface that is complimentary to the curvature of the curved vertical recess surfaces 148 and 150. The detent 144 may also include a pair of lips 152 and 154 that extend towards one another and extend beyond at least a portion of the pivoting leg 138. As disclosed, the lips 152 and 154 include material of the base 134 whose position inhibit pivoting leg 138 from being released from the detent 144. With the disclosed arrangement, the pivoting leg 138 is held in the initial supporting position 122, but, upon additional force or pressure can extend to a substantially flat orientation as best seen in FIGS. 10, 12, and 13.

Base 134 defines at least one opening 161 through which the pivoting leg 138 may move beyond the initial retaining position 122 and assume a open position of 180 degrees relative to the closed position. This ability to assume positions from 0 degrees in an initial flat state, to an intermediary locked position such as a 90 degree orientation and to further be placed into a 180 degree flat configuration allows the fluid containment apparatus 10 to function as a drive-in/drive out configuration. In other words, a vehicle or mobile structure such as a barrel can be rolled into the containment apparatus 10 with the pivoting leg 138 is in or placed into a 0 degree position. Thereafter, if pivoting leg 138 is in a engaged 90 degree position, application of additional outward pressure will allow the pivoting leg 138 to assume a 180 degree flat configuration. As such, a vehicle or structure inside the containment apparatus 10 can be rolled out and without damage to the pivoting leg 138 or support base 134. vehicle or structure inside the containment apparatus 10 can be rolled out and without damage to the pivoting leg 138 or support base 134.

If desired, the present embodiment can function similar to the operation of the first embodiment. However, by providing an opening 161 within the base 134 for additional directional movement of the pivoting leg 138, additional functionality as provided. The ability for the wall support 120 to assume positions which range from about 0 to about 180 degrees, prevent damage to the hinge should a collapsing force be applied along any direction of the hinge movement.

Figure 15:
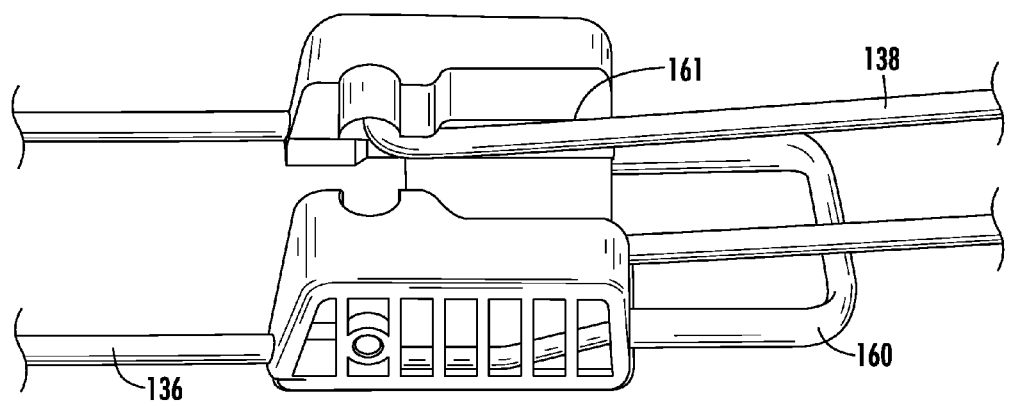

As seen in reference to FIGS. 11-14, the opening 161 may define edge walls similar in dimension to the edge wall dimensions along the front of the base 134. In other words, the edges of the base walls 142 and 144 can extend on either side of the detent 144. The opposing wall surfaces may be curved so as to provide a taper that narrows and imparts greater resistance to movement of the pivoting leg 138. Alternatively, the opposing edge walls can taper outwardly relative to the pivoting leg 138 such that less or no resistance is provided between the pivoting leg 138 and the defined wall surfaces, of the base 134 as the pivoting leg is urged into a 180 degree open configuration. An example of the later configuration is seen in reference to FIGS. 14-15. In yet another embodiment, the defined wall spaces which extend in the area beyond detent 144 as the pivoting leg 138 is extended to a 180 degree position, can define a uniform, non-tapering configuration. The fixed distance can be chosen to provide whatever level of resistance to movement that may be desired between the pivoting leg member 138 and opposing portions of the base walls. As discussed in other embodiments, the material used for the pivoting leg can provided some or all of the flexing action needed for full movement along the 180 degree path, the base material can be chosen to allow the needed flexing, or a combination of flexing can be achieved by both the pivoting leg member and the material used in the construction of base 134.

Once it is desired to move the wall support 120 to the either the collapsed position (0 degrees) 126, or the opened flat position (180 degrees) the detent 144 and pivoting leg 138 are arranged to accommodate such repositioning. Application of a sufficient amount of force to the pivoting leg 138, for example upon being acted upon by the weight of a vehicle 82, causes the pivoting leg 138 to be snapped out of the detent 144 and subsequently allowed to pivot with respect to the base 134. The sufficient amount of force from either direction may function to compress the lips 152 and 154 thus allowing the pivoting leg 138 to have room sufficient to be forced beyond the lips 152 and 154 and hence out of the detent 144. In this arrangement, the base 134 can be made of a material that has some degree of inherent flexibility to allow the lips 152 and 154 to flex an amount to allow the pivoting leg 138 to pass.

Alternatively, the u-shaped construction of the pivoting leg 138 may allow the pivoting leg 138 to compress upon the application of the sufficient amount of force. In this regard, the curved vertical recess surfaces 148 and 150 in addition to, or alternatively to, the lips 152 and 154 may have a wedge or inclined shape that facilitates the removal and insertion of the pivoting leg 138 into and out of the detent 144. The oppositely disposed portions of the pivoting leg 138 may be moved towards one another upon the application of the sufficient amount of force, and the pressing of the pivoting leg 138 against the surfaces 148 and 150 and/or lips 152 and 154. In this regard, the central opening defined by the u-shaped pivoting leg 138 may become smaller due to the flexing of the opposite portions of the pivoting leg 138 to one another. The pivoting leg 138 can then be moved beyond the lips 152 and 154 and out of the detent 144. The shape of the pivoting leg 138 allows it to flex. In other arrangements of the wall support 20, the pivoting leg 138 may be removed from the detent 144 via a combination of both flexing of the lips 152 and 154 and flexing of the pivoting leg 138.

Once removed from the detent 144, the pivoting leg 138 is free to be pivoted with respect to the base 134 and the inner support leg 136. The pivoting leg 138 may be capable of pivoting in a direction either toward or away from the inner support leg 136. In order to return the pivoting leg 138 to the initial supporting position 122, a return force can be applied that is sufficient to reinsert the pivoting leg 138 back into the detent 144. The same mechanisms, flexing of the lips 152 and 154 in addition to or alternatively to flexing of the pivoting leg 38, may be employed to return the pivoting leg 138 to the detent 144.

Other mechanisms or arrangements, between the pivoting leg 138 and the base 134 can be employed to maintain the orientation between these components and to also allow these components to move with respect to one another. For example, the lips 152 and 154 could be removed or could be modified so that they incorporate spring loaded detent pins or balls. The pivoting leg 138 and portions of the base 134, such as the lips 152 and 154 if present, need not flex or move. The initial, stationary position of the pivoting leg 138 can be maintained with respect to the base 134 as the spring loaded detent pins or balls will prevent the pivoting leg 138 from further pivoting. However, the application of a sufficient amount of force to the pivoting leg 138 will cause the spring loaded detent pins or balls to be recessed into the base 134. The pivoting leg 138 will then move past the spring loaded detent pins or balls and down into either a 0 degree collapsed position or a fully opened 180 degree Position. With such an arrangement, the plastic or other material making up the base 134 and the pivoting leg 138 do not have to flex when movement of the pivoting leg 138 out of or into the supporting position is desired. The only portions that would "flex" would be the spring loaded detent pins or balls and these would simply move in or out as necessary.

The initial supporting position 122, may define an angle 140 which may be different in other exemplary embodiments. For example, the angle 140 may be 85°, 80°, 95°, 100°, 105°, from 75° to 120°, or up to 150° in accordance with other exemplary embodiments of the fluid containment apparatus 10. The deployed angle 140 may be any angle that provides for sufficient deployment of the side wall(s) 14 so as to maintain the fluid containment apparatus 10 in a fluid containing position. The detent 144 acts to limit the initial pivoting range 162 of the pivoting leg 138 with respect to the base 34. Upon application of additional force in an outward direction, the pivoting leg 138 be fully extend to a 180 degree open position.

An additional embodiment of the present invention is seen in reference to FIGS. 19-22. As illustrated, the wall support 220 is similar in construction and operation to the embodiment seen and described in reference to FIGS. 3-5. A lever 221 is provided having an engagement tab 223, tab 223 being responsive to a downward release force supplied by a user's foot or hand. When tab 223 of lever 221 is pushed downwardly, a clasp 225 defined along a portion of lever 221 is pivoted upwardly and releases a cross brace member 284 which is engaged with clasp 225. The interaction between class 225 and cross member 284 can be a frictional fit which locks the cross brace member 284 within the clasp 225.

Similarly, as the pivoting support leg 238 is raised to an upright position, a connector such as cross member 284, will engage clasp 225 in a secured position. In one embodiment, the engagement of clasp 225 with cross member 284 also conforms to a raised position when pivoting leg 238 engages a portion of the base 234 such that base 234 provides a mechanical stop to prevent further movement of the pivoting leg 238.

While not separately illustrated, the lever 221 may be spring actuated as is known in the art such that the lever 221 will assume a "ready" position for receiving the raised pivoting leg 228. Such a spring can be a coil spring associated with the pivot 227 or lever 221 may use some other spring or elastic connection such that lever 221 is maintained in a desired position when pivoting leg 38 is not engaged with clasp 225.

Under field conditions, the ability to disengage by foot action the wall support 220 such that it assumes a closed position simplifies the collapse of the containment apparatus. The release mechanism as seen in lever 221 also minimizes damage that may otherwise occur by operators who may kick or position with foot pressure wall support embodiments that do not provide for an assisted release mechanism.

Figure 23:
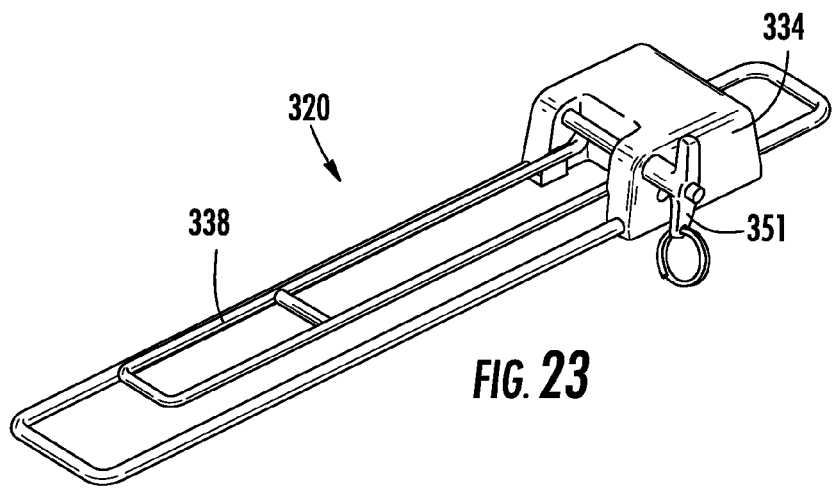
FIGS. 23-26 are perspective, views of an alternative embodiment of a wall support.
Figure 24:
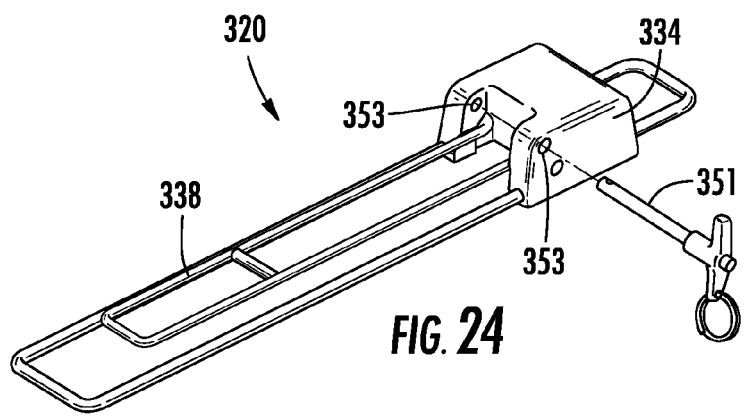
Figure 25:
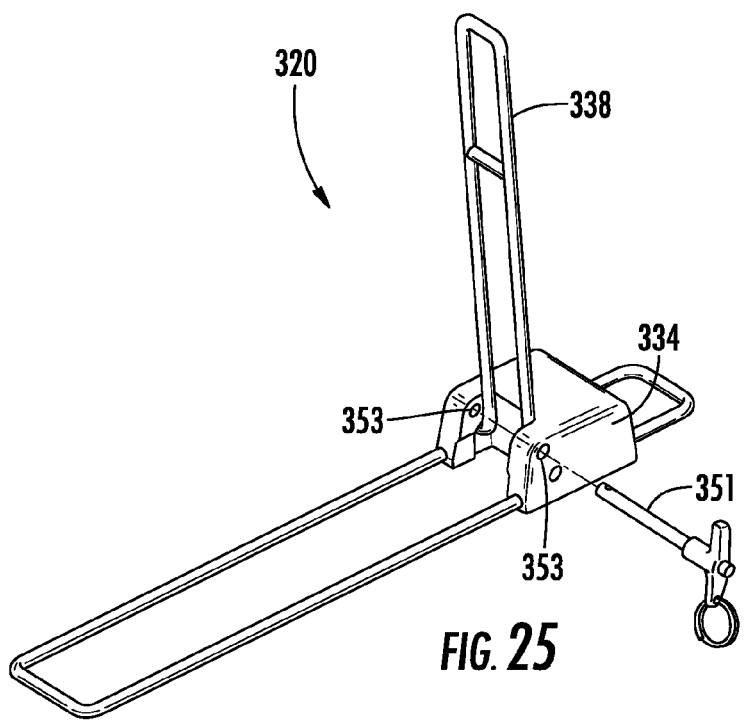
Figure 26:
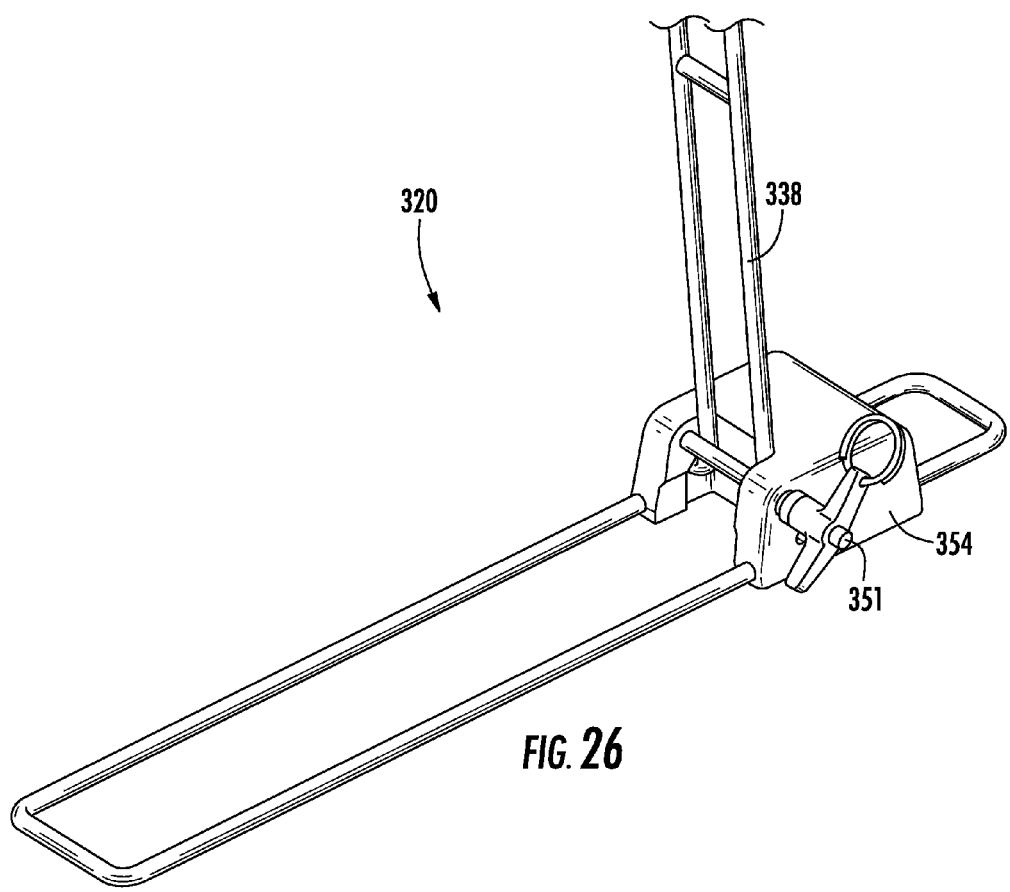

An additional embodiment of a wall support can be seen in relation to FIGS. 23-26. The illustrated embodiment utilizes similar and analogous structures and elements as discussed in relation to other embodiments. As illustrated in FIGS. 23-26, the wall support 320 is provided having a release pin 351. As seen release pin 351 can engage a pair of aligned apertures 353 defined in base 334. The insertion of release pin 351 will provide a blocking mechanism which will keep the pivoting leg 338 in either one of a down closed position of 0° (FIG. 23) or in an upright opened position (FIG. 24).

The release pin 351 can be provided from any number of suitable materials including metals or plastics. In some embodiments it may be useful for the pin 351 to have a shear strength substantially less than the bending strength of the pivoting leg 338. This feature allows release pin 351 to cleanly break under excess load without risking the destruction of the entire wall support 320. Accordingly, replacement pin 351 can be supplied as opposed to replacing an entire hinge or wall support 320.

Release pin 351 also provides additional safety when the containment apparatus is supported in the upright position as illustrated in FIG. 24. When in an upright position, wall supports 320 can be subjected to high winds, snow or ice which may cause the collapse of the hinge and corresponding container. Pin 351 provides the additional security against an unintended collapse or breach of the containment apparatus which could release contents of the containment apparatus to the environment.

Release pin 351 will also maintain the wall support 320 in a closed portion (FIG. 23). This allows the folding, storage, and set-up of a containment apparatus without the wall supports moving or positioning into an undesired upright on opened position.

Figure 16:
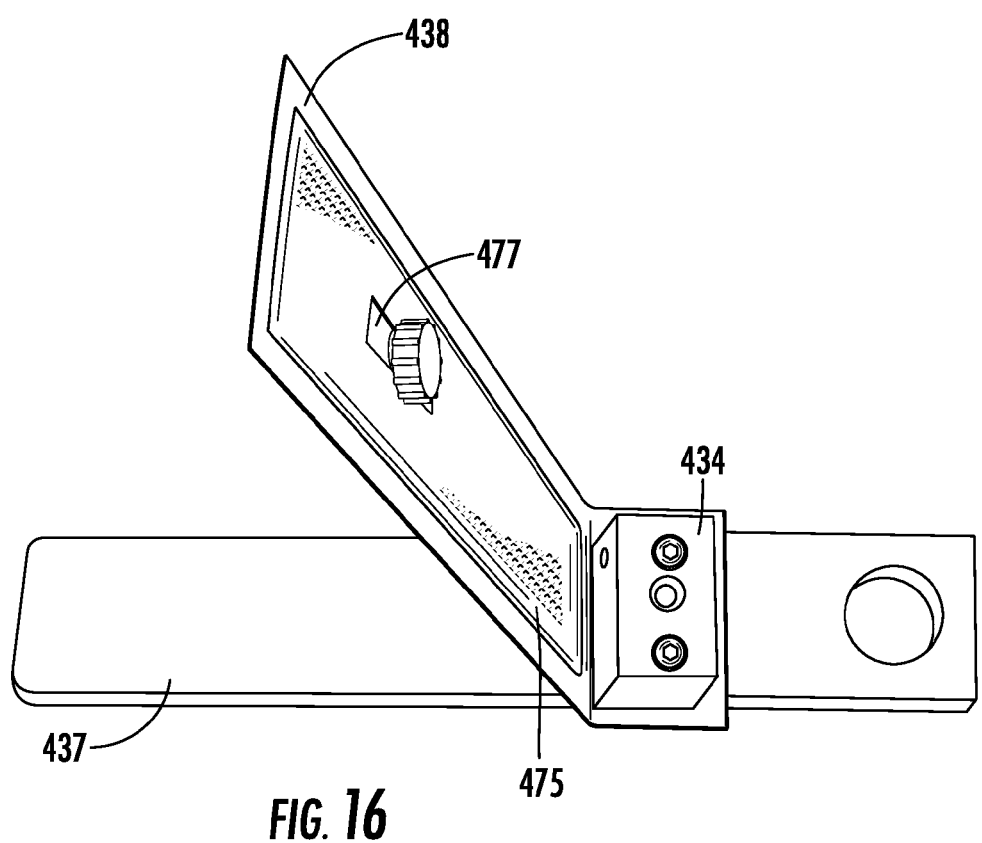
FIGS. 16-18 are perspective views of an alternative embodiment of a wall support.
Figure 17:
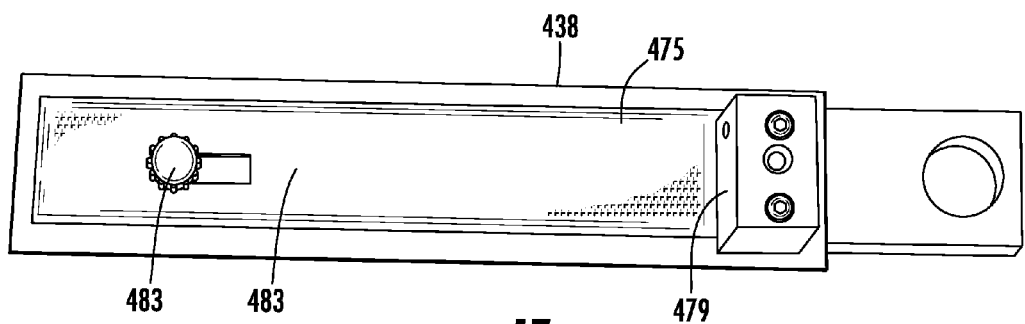
Figure 18:
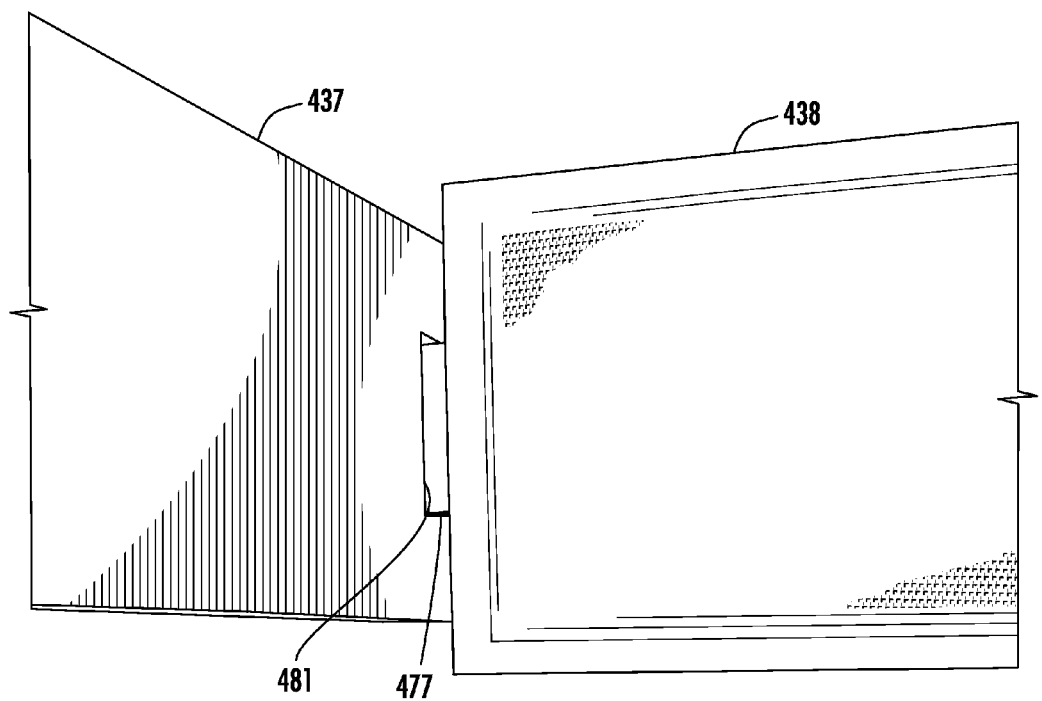

An additional embodiment is seen in reference to FIGS. 16-18 of a wall support 420 that may be used with various types of containment apparatuses 10 described herein. As illustrated, a support leg 437 is provided in which a pivoting leg 438 is attached. Pivoting leg 438 is further defined by a flexible fabric sleeve 475 which retains therein a sliding member 477. Sliding member 477 is adapted to slide into sleeve 475. A terminal end of pivoting leg 438 defines a tab 479 which is adapted for engaging through a complimentary opening in sleeve 475 to a slot 481 defined on a surface of support leg 437. Slot 481 may form an opening extending the entire thickness of support leg 437 or may have a depth less than the entire thickness of the support leg 437. Additionally, the slot 481 may be perpendicular relative to the surface of support leg 437 or is defined at an angle to facilitate the insertion and deployment angle of the pivoting leg 438 relative to the support leg 437.

In operation, when the pivoting leg 438 is moved from a flat configuration to a raised position, the terminal end 470 will automatically engage slot 481 which locks the pivoting leg 438 into position. A base 434 is positioned along a portion of the flexible sleeve 475 to secure the sleeve 475 to the upper surface of the support leg 437. Base 434 also provides a mechanical stop which limits the raised movement of pivoting leg 438 relative to support 437.

A handle 483 is carried by pivoting leg 438, handle 483 extending from a sleeve 475 through an appropriate slit. Handle 483 allows an upward disengaging force to be applied to pivoting leg 438. When such a force is applied, the terminal tab end 479 is disengaged from slot 481 and the pivoting leg 438 can be placed into a closed position.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A wall support for a liquid containment apparatus comprising:
   a base member;
   a first support leg extending from the base member, the first support leg providing support to the wall support when the wall support is in a collapsed position, a support position, and an opened flat position; and
   a pivoting leg pivotally engaging the base member and configured to be secured to a side wall of a liquid containment apparatus to support a portion of the side wall, the pivoting leg being positional from a first position substantially parallel to the first support leg and at about 0° as measured from the first support leg when the wall support is in the collapsed position to a second position where the pivoting leg is at a deployed angle to the first support leg when the wall support is in the supporting position and the pivoting leg being positional in a third position that is substantially parallel to a first position such that the pivoting leg is positioned at about 180° as measured from the first support leg when the wall support is in the opened flat position, the pivoting leg when in the second position being secured within a detent defined by the base member; and
   when the wall support is in the second position and is subsequently movable back to the first position, the pivoting leg is forcable out of the detent upon a sufficient amount of force being applied to the pivoting leg so as to pivot with respect to the base member towards the first support leg, and when the wall support is in the first position and is subsequently movable back to the second position, sufficient force applied to the pivoting leg causes the pivoting leg to be forced back into the detent to be held by the detent.

2. The wall support according to claim 1, wherein the base member and the first support leg remain in the same location when the wall support is in both the first position and in the second position, and wherein the pivoting leg changes locations when the wall support is moved from the first position to the second position at the deployed angle.

3. The wall support according to claim 1, further comprising a second support leg that extends outward from the base member at about 180° from the first support leg.

4. The wall support according to claim 3, wherein the second support leg and the first support leg comprise a single integral piece.

5. The wall support according to claim 1, wherein the base member defines at least one opening into which the pivoting leg is moveable to hold the pivoting leg in the third position.

6. The wall support according to claim 5, wherein the base member comprises edge walls that define the opening into which the pivoting leg is moveable to hold the pivoting leg in the third position.

7. The wall support according to claim 6, wherein the edge walls narrowing taper inwardly to impart a resistance to movement of the pivoting leg when in the third position.

8. The wall support according to claim 6, wherein the edge walls taper outwardly to reduce resistance to movement of the pivoting leg when in the third position.

9. The wall support according to claim 1, wherein the base member defines at least one curved horizontal receiving surface into which the pivoting leg is moveable to hold the pivoting leg in the first position.

10. The wall support according to claim 1, wherein the detent comprises a pair of lips that extend towards one another and extend beyond at least a portion of the pivoting leg when the pivoting leg resides in the detent, the lips comprising material of the base member and the lips positioned to inhibit pivoting leg from being released from the detent.

11. The wall support according to claim 10, wherein the pivoting leg is compressible to facilitate movement between the first position and the second position.

12. The wall support according to claim 10, wherein the lips of the detent are flexible to facilitate movement of the pivoting leg between the first position and the second position.

13. The wall support according to claim 1, wherein the detent is positioned within the base member such that a deployed angle is at least one of 85°, 80°, 95°, 90°, 100°, or 105°.

14. A wall support for a liquid containment apparatus comprising:
   a base;
   an inner support leg extending in a first direction, the inner support leg being supported by the base, the first support leg providing support to the wall support when the wall support is in a collapsed position, a support position, and an opened flat position; and
   a pivoting leg pivotally engaging the base and configured to be secured to a side wall of a liquid containment apparatus to support a portion of the side wall, the pivoting leg being positional among a collapsed position substantially parallel to the inner support leg and at about 0° as measured from the inner support leg when the wall support is in the collapsed position to an initial supporting position where the pivoting leg is at a deployed angle as measured from the inner support leg when the wall support is in the supporting position to an opened flat position substantially parallel to the inner support leg and at about 180° as measured from the inner support leg when the wall support is in the open flat position, wherein the pivoting leg when in the initial supporting position is secured within a detent defined by the base and the pivoting leg moveable out of the detent upon a sufficient amount of force being applied to the pivoting leg when the pivoting leg is moved from the initial supporting position to the collapsed position and from the initial supporting position to the opened flat position.

15. The wall support according to claim 14, wherein the base defines at least one curved horizontal receiving surface into which the pivoting leg is moveable to hold the pivoting leg in the collapsed position.

16. The wall support according to claim 14, wherein the base defines at least one opening into which the pivoting leg is moveable to hold the pivoting leg in the opened flat position.

17. The wall support according to claim 14, further comprising an outer support leg extending in an opposite second direction from the first direction in which the inner support leg extends, the inner support leg and the outer support leg being supported by the base.

18. The wall support according to claim 1, wherein the pivoting leg is compressible for receipt in and removal from the detent to facilitate movement between the first position and the second position.

19. A fluid containment apparatus, comprising:
   a floor;
   a side wall that with the floor at least partially defines a containment area for fluid; and
   one or more wall supports that support the side wall, each of the one or more wall supports engaging and supporting a portion of the side wall, each wall support comprising:
      a base member;
      a first support leg extending from the base member, the first support leg providing support to the wall support when the wall support is in a collapsed position, a support position, and an opened flat position; and
      a pivoting leg pivotally engaging the base member and configured to be secured to the side wall to support a portion of the side wall, the pivoting leg being positional from a first position substantially parallel to the first support leg when the wall support is in the collapsed position to a second position where the pivoting leg is at a deployed angle to the first support leg when the wall support is in the supporting position, the pivoting leg when in the second position being secured within a detent defined by the base member; and
   the first position comprising the pivoting leg being positioned at about 0° as measured from the first support leg and the pivoting leg being positional in a third position that is substantially parallel to a first position when the wall support is in the opened flat position such that the pivoting leg is positioned at about 180° as measured from the first support leg; and
   the pivoting leg moveable out of the detent upon a sufficient amount of force being applied to the pivoting leg when the pivoting leg is moved from the second position to the first position and from the second position to the third position.

* * * * *